(12) United States Patent  (10) Patent No.: US 8,437,578 B2
Alasia et al.  (45) Date of Patent: *May 7, 2013

(54) DIGITAL ANTI-COUNTERFEITING SOFTWARE METHOD AND APPARATUS

(75) Inventors: Alfred V. Alasia, Wellington, FL (US); Alfred J. Alasia, Royal Palm Beach, FL (US); Thomas C. Alasia, Wellington, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/880,622

(22) Filed: Sep. 13, 2010

(65) Prior Publication Data

US 2011/0123125 A1   May 26, 2011

Related U.S. Application Data

(63) Continuation of application No. 11/025,531, filed on Dec. 29, 2004, now Pat. No. 7,796,753, which is a continuation of application No. 09/005,736, filed on Jan. 12, 1998, now Pat. No. 6,859,534, which is a continuation-in-part of application No. 08/564,664, filed on Nov. 29, 1995, now Pat. No. 5,708,717.

(51) Int. Cl.
*G06K 9/32* (2006.01)

(52) U.S. Cl.
USPC ........... 382/294; 382/297; 382/283; 382/181; 382/115; 382/209; 713/176; 713/158; 713/168; 713/170; 380/54; 380/51; 283/72; 283/73; 283/91; 358/3.28; 340/5.86; 235/454; 235/487; 235/494

(58) Field of Classification Search .................. 380/51
See application file for complete search history.

(56) References Cited

U.S. PATENT DOCUMENTS

| 3,524,395 A | 8/1970 | Alasia |
| 3,635,778 A | 1/1972 | Rice et al. |
| 3,642,346 A | 2/1972 | Dittmar |

(Continued)

FOREIGN PATENT DOCUMENTS

| CA | 1172282 | 8/1984 |
| EP | 0 256 176 A1 | 2/1988 |
| WO | WO 95/34018 | 12/1995 |

OTHER PUBLICATIONS

*Graphic Security Systems Corp. v. Nautilus Security*; C.A. No. 6: 08-4034-HFF; Defendant Nautilus Security's Second Supplemental Invalidity Claim Chart; filed May 24, 2011.

(Continued)

*Primary Examiner* — Nathan Flynn
*Assistant Examiner* — Bryan Wright
(74) *Attorney, Agent, or Firm* — Novak Druce Connolly Bove + Quigg LLP

(57) ABSTRACT

This invention relates generally to a method and apparatus, as implemented by a software program on a computer system, for digitally producing counterfeit-deterring scrambled or encoded indicia images. This method and system are capable of combining a source image with a latent image so the scrambled latent image is visible only when viewed through a special decoder lens. The digital processing allows different latent images to be encoded according to different parameters. Additionally, latent images might be encoded into single component colors of an original visible image, at various angles from each other.

20 Claims, 30 Drawing Sheets

U.S. PATENT DOCUMENTS

| | | | |
|---|---|---|---|
| 3,675,948 A | 7/1972 | Wicker | |
| 3,769,890 A | 11/1973 | Alasia | |
| 3,784,289 A | 1/1974 | Wicker | |
| 3,922,074 A | 11/1975 | Ikegami et al. | |
| 3,937,565 A | 2/1976 | Alasia | |
| 3,961,956 A | 6/1976 | Fukuda et al. | |
| 4,092,654 A | 5/1978 | Alasia | |
| 4,143,967 A | 3/1979 | Wicker | |
| 4,196,453 A | 4/1980 | Warren | 358/447 |
| 4,198,147 A | 4/1980 | Alasia | |
| 4,255,652 A | 3/1981 | Weber | |
| 4,313,087 A | 1/1982 | D'Amato et al. | |
| 4,591,189 A | 5/1986 | Holmen et al. | |
| 4,668,597 A | 5/1987 | Merchant | |
| 4,914,700 A | 4/1990 | Alasia | |
| 4,935,335 A | 6/1990 | Fotland | |
| 4,972,476 A | 11/1990 | Nathans | |
| 4,987,487 A | 1/1991 | Ichinose et al. | |
| 5,018,767 A | 5/1991 | Wicker | |
| 5,027,401 A | 6/1991 | Soltesz | |
| 5,034,982 A | 7/1991 | Heninger et al. | |
| 5,088,050 A | 2/1992 | Ito | |
| 5,113,213 A | 5/1992 | Sandor et al. | |
| 5,149,140 A | 9/1992 | Mowry et al. | |
| 5,171,040 A | 12/1992 | Orndorff | |
| 5,178,418 A | 1/1993 | Merry et al. | |
| 5,193,853 A | 3/1993 | Wicker | |
| 5,239,625 A | 8/1993 | Bogart et al. | |
| 5,297,815 A | 3/1994 | Anderson | |
| 5,303,334 A | 4/1994 | Snyder et al. | |
| 5,303,370 A | 4/1994 | Brosh et al. | 380/51 |
| 5,311,329 A | 5/1994 | Haeberli et al. | |
| 5,315,691 A | 5/1994 | Sumiya et al. | |
| 5,321,749 A | 6/1994 | Virga | |
| 5,364,274 A | 11/1994 | Sekiguchi | |
| 5,374,976 A | 12/1994 | Spannenburg | |
| 5,396,559 A | 3/1995 | McGraw | |
| 5,414,527 A * | 5/1995 | Koshi et al. | 382/239 |
| 5,418,572 A | 5/1995 | Nonweiler et al. | 348/446 |
| 5,436,974 A | 7/1995 | Kovanen | 283/73 |
| 5,460,679 A | 10/1995 | Abdel-Kader | |
| 5,488,451 A | 1/1996 | Goggins | |
| 5,491,563 A | 2/1996 | Pomerantz | |
| 5,515,456 A | 5/1996 | Ballard | 382/252 |
| 5,519,794 A | 5/1996 | Sandor et al. | |
| 5,539,487 A | 7/1996 | Taguchi et al. | |
| 5,583,941 A | 12/1996 | Yoshida et al. | 380/51 |
| 5,617,178 A | 4/1997 | Goggins | |
| 5,680,463 A | 10/1997 | Windel et al. | |
| 5,697,006 A | 12/1997 | Taguchi et al. | |
| 5,715,316 A | 2/1998 | Steenblik et al. | |
| 5,715,331 A | 2/1998 | Hollinger | |
| 5,745,604 A | 4/1998 | Rhoads | |
| 5,748,783 A | 5/1998 | Rhoads | |
| 5,823,576 A | 10/1998 | Lambert | |
| 5,832,119 A | 11/1998 | Rhoads | |
| 5,847,808 A | 12/1998 | Goggins | |
| 5,850,580 A | 12/1998 | Taguchi et al. | |
| 5,857,038 A | 1/1999 | Owada et al. | |
| 5,859,920 A * | 1/1999 | Daly et al. | 382/115 |
| 7,466,876 B2 * | 12/2008 | Alasia | 382/294 |
| 2005/0123134 A1 | 6/2005 | Alasia | |

OTHER PUBLICATIONS

TNO Report; Dec. 1993; 19 pages.

Complaint C.A. No. 6:08-4034-HFF; *Graphic Security systems Corp.* v. *Nautilus Security*, May 24, 2011.

Final Judgment and Permanent Injunction and Findings of Fact and Conclusions of Law; *Graphic Security Systems Corp.* v. *Juratrade KFT*, May 24, 2011.

Securty Documens—Pactical Guide for the Securiy Documents Prntng Sector; Bert van den Assem et al.; Sdu Publishers, the Hague, Feb. 1994.

Embedding Secret Information into a Dithered Multi-level Image; Tanaka et al., Dept. of Computer Science, The Natl. Defense Acad., IEEE 1990.

Watermarking Images; Christopher Dautzenberg; Dept. of Microelectronics & Elec. Engng., Trinity College, Dublin; Oct. 1994.

Digital Halftoning; Robert Ulichney; MIT Press; Cambridge MA; London, England, Jan. 1, 1987.

*Computer Design* vs. *Computer Printing*; Jura JSP Ltd., Intergraf—Security Printers Conference; Seville; May 15-17, 1997.

*Graphic Security Systems Corp.* v. *Nautilus Security*; Answer, Affirmative Defenses and Counterclaims; filed Mar. 16, 2009.

*Graphic Security Systems Corp.* v. *Nautilus Security*; Defendant Nautilus Security's Invalidity Claim Chart; dated Jul. 13, 2009.

*Graphic Security Systems Corp.* v. *Nautilus Security*; Defendant Nautilus Security's Invalidity Claim Chart; dated Apr. 12, 2010.

*Graphic Security Systems Corp.* v. *Nautilus Security*; Plaintiff's Prior Art Statement; served Aug. 10, 2009.

*Graphic Security Systems Corp.* v. *Nautilus Security*; Plaintiff's Supplemental Prior Art Statement; dated May 10, 2010.

*Graphic Security Systems Corp.* v. *Nautilus Security*; Graphic's Objections and Responses to Nautilus's First Set of Interrogatories; served Jul. 16, 2009.

*Graphic Security Systems Corp.* v. *Nautilus Security*; Graphic's Objections and Responses to Nautilus's Second Set of Interrogatories; served Apr. 7, 2010.

*Graphic Security Systems Corp.* v. *Nautilus Security*; Graphic's Supplemental Responses to Nautilus's First Interrogatories and Requests for Production; served Apr. 14, 2010.

*Graphic Security Systems Corp.* v. *Nautilus Security*; Graphic's Objections and Responses to Nautilus's First Requests for Admission; served Apr. 7, 2010.

*Graphic Security Systems Corp.* v. *Nautilus Security*; Graphic's Objections and Responses to Nautilus's First Requests for Admission; served Apr. 21, 2010.

*Graphic Security Systems Corp.* v. *Nautilus Security*; Graphic's Objections and Responses to Nautilus's Second Set of Interrogatories; served Apr. 21, 2010.

*Graphic Security Systems Corp.* v. *Nautilus Security*; Graphic's Supplemental Objections and Responses to Nautilus's First Requests for Admission; served May 3, 2010.

Agreement Between Graphic Security Systems Corp. and JuraTrade; signed Nov. 30, 2000.

*Graphic Security Systems Corp.* v. *Nautilus Security*; Case No. 6:09-4034-HFF; Deposition of the Witness Alfred Victor Alasia; Dec. 17, 2009; pp. 22-68, 88-90.

*Graphic Security Systems Corp.* v. *Nautilus Security*; Case No. 6:09-4034-HFF; Deposition of the Witness Thomas C. Alasia; Dec. 17, 2009; pp. 57-59, 122-132, 169-174 and 217.

* cited by examiner

One

Two

Three

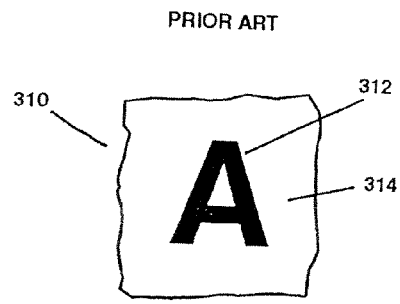
Fig. 23
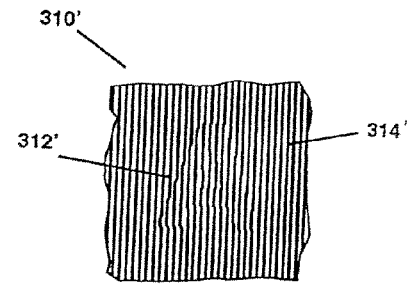
Fig. 23B
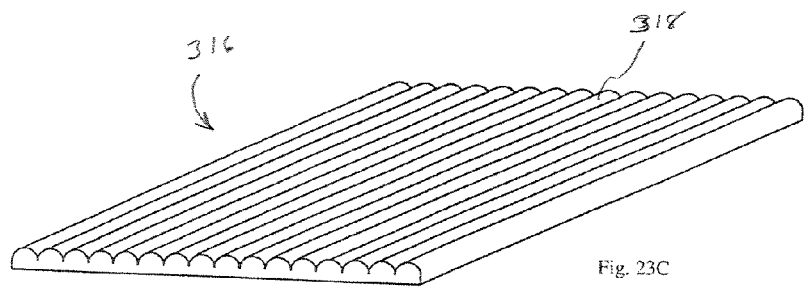
Fig. 23C
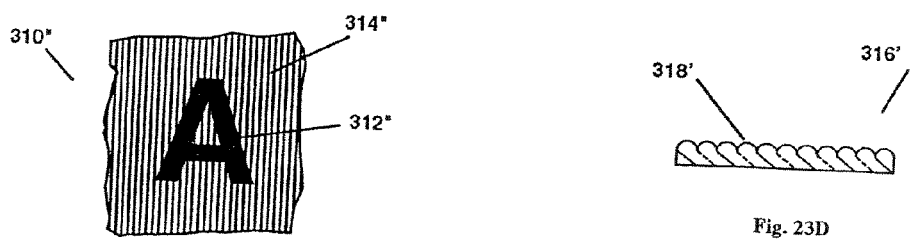
Fig. 23E
Fig. 23D

DIGITAL ANTI-COUNTERFEITING SOFTWARE METHOD AND APPARATUS

CROSS-REFERENCE TO RELATED APPLICATIONS

This application is a continuation of U.S. application Ser. No. 11/025,531 filed Dec. 29, 2004, now U.S. Pat. No. 7,796,753, which is a continuation of U.S. application Ser. No. 09/005,736 filed Jan. 12, 1998, now U.S. Pat. No. 6,859,534, which is a continuation-in-part of U.S. application Ser. No. 08/564,664, filed Nov. 29, 1995, now U.S. Pat. No. 5,708,717, all of which are incorporated herein by reference in their entirety. This application is related to U.S. application Ser. No. 11/868,607, filed Oct. 6, 2007, now U.S. Pat. No. 7,466,876, and to U.S. application Ser. No. 11/372,514, filed Mar. 10, 2006.

FIELD OF THE INVENTION

This invention relates generally to a method and apparatus, as implemented by a software program on a computer system, for producing counterfeit-deterring scrambled or coded indicia images, typically in a printed form. This method and system are capable of combining a source image with a latent image so the latent image is visible only when viewed through a special decoder lens.

BACKGROUND INFORMATION

To prevent unauthorized duplication or alteration of documents, frequently there is special indicia or a background pattern provided for sheet materials such as tickets, checks, currency, and the like. The indicia or background pattern is imposed upon the sheet material usually by some type of printing process such as offset printing, lithography, letterpress or other like mechanical systems, by a variety of photographic methods, by xeroprinting, and a host of other methods. The pattern or indicia may be produced with ordinary inks, from special inks which may be magnetic, fluorescent, or the like, from powders which may be baked on, from light sensitive materials such as silver salts or azo dyes, and the like. Most of these patterns placed on sheet materials depend upon complexity and resolution to avoid ready duplication. Consequently, they add an increment of cost to the sheet material without being fully effective in many instances in providing the desired protection from unauthorized duplication or alteration.

Various methods of counterfeit-deterrent strategies have been suggested including Moire-inducing line structures, variable-sized dot patterns, latent images, see-throughs, barcodes, and diffraction based holograms. However, none of these methods employs a true scrambled image or the added security benefits deriving therefrom.

This same inventor earlier disclosed a novel system for coding and decoding indicia on printed matter by producing a parallax panoramagram image. These principles and embodiments of U.S. Pat. No. 3,937,565, issued Feb. 10, 1976 are hereby incorporated by reference. The indicia were preferably produced photographically using a lenticular line screen (i.e. a lenticular screen) with a known spatial lens density (e.g. 69 lines per inch). A specialized auto-stereoscopic camera might be used to produce the parallax image such as the one described in this inventor's U.S. Pat. No. 3,54,395, issued Aug. 18, 1970, and U.S. Pat. No. 3,769,890, issued Nov. 6, 1973.

Photographic, or analog, production of coded indicia images has the drawback of requiring a specialized camera. Also, the analog images are limited in their versatility in that an area of scrambled indicia is generally noticeable when surrounded by non-scrambled images. Also, it is difficult to combine several latent images, with potentially different scrambling parameters, due to the inability to effectively re-expose film segments in generating the scrambled, photographic image.

Systems such as described in U.S. Pat. Nos. 3,937,565; 3,769,890; 4,092,654; 4,198,147; and 4,914,700 disclose methods of preventing counterfeiting by forming a parallax panoramagram image of a subject, known as Scrambled Indicia® system, typically photographically through a lenticular line screen (i.e. a lineticular screen).

Scrambled images resist ready reproduction by photographic or xerographic techniques inasmuch as the extent of scrambling or encoding provided by these systems is controlled by a large variety of parameters peculiarly under the control of the originator of the scrambled or encoded image. Yet, the scrambled image can be unscrambled for visual examination using a decoder that is substantially a duplicate of the lenticular screen used to form the original image.

The systems and methods described in the above-identified prior art patents typically employ an autosteroscopic camera for photographing artwork so as to produce a scrambled parallax panoramagram thereof. Specifically, the camera includes a lenticular screen and a photosensitive element is placed in the combined image plane of the camera formed by the objective lens and the lenticular screen. The image of the graphic to be encoded is focused on the photosensitive element in the image plane of the camera with a small aperture stop that increases the depth of focus. The lenticular screen and photosensitive element are then moved longitudinally along the optical axis of the camera with respect to the objective lens of the camera to one edge of, but within the limits defining, the depth of focus. The photosensitive element is then expose to the light projected from the graphic while the lenticular screen and photosensitive element are moved together laterally relative to the objective lens of the camera to expose successive portions of the photosensitive element underlying the screen. The relative movements are such that the point image of the subject center of the graphic will be recorded in the center of the photosensitive element as a blurred spot, which is moved progressively in the course of the relative movement of the objective lens, lenticular screen and photosensitive element.

The resulting image formed on the photosensitive element is a lenticular dissection of the image of the graphic, as well as an image in which the displacement between the subject center and the second conjugate point introduces a scrambling factor so that the scrambled or encoded image cannot readily be identified by unaided vision.

As an alternative security printing system, diffraction-based images such as embossed holograms have been incorporated into the surface of credit cards and the like. Although this tactic initially reduced the incidence of forgeries, the technology for reproducing and incorporating embossed holograms has become sufficiently widespread that its use in preparing security devices has been impaired.

Another optical documentary security and object authentication device is the optically variable device, such as a KINEGRAM®, available for Landis & Gyr Communications (Switzerland) Corp., which is another diffraction-based system that can be fabricated using an embossing technique and presents distinctive dynamic optical effects easily visualized by an observer. The system is suggested for us as a high-level optical security device to protect banknotes, passports, Visas, ID-cards, and other security documents against counterfeit and tampering. The image of a KINEGRAM® is created by a plurality of invisibly small elementary areas of reflective micro-profiles, each of which diffract illuminating light. The elementary areas are used to compose lines and graphical elements. For each area or line element, micro-profile size and shape, the angles of diffraction and diffraction intensities are calculated to produce the overall image.

Accordingly, a method and apparatus are needed whereby the photographic process and its results are essentially simulated digitally via a computer system and related software. Additionally, a system is needed whereby scrambled latent images can be integrated into a source image, or individual color components thereof, so that the source image is visible to the unaided eye and the latent image is visible only upon decoding. Also needed is the ability to incorporate multiple latent images, representing different "phases", into the source image for added security.

SUMMARY OF THE INVENTION

The present invention provides a software method and apparatus for digitally scrambling and incorporating latent images into a source image. The latent image—in digitized form—can be scrambled for decoding by a variety of lenticular lenses as selected by the user, with each lens having different optical properties such as different line densities per inch, and/or a different radius of curvature for the lenticules. Different degrees of scrambling might also be selected wherein the latent image is divided up into a higher multiplicity of lines or elements. For decoding purposes, the multiplicity of elements would be a function of the lens density.

The source image is then rasterized, or divided up into a series of lines equal in number to the lines making up the scrambled latent images. Generally, when hard copy images are printed, the image is made up of a series of "printers dots" which vary in density according to the colors found in the various component parts of the image. The software method and apparatus of the present invention, takes the rasterized lines of the source image and reforms them into the same general pattern as the lines of the scrambled latent image. Hence, where the source image is darker, the scrambled lines are formed proportionately thicker; where the source image is lighter, the scrambled lines are formed proportionately thinner. The resulting combined image appears to the unaided eye like the original source image. However, since the component rasterized lines are formed in the coded pattern of the scrambled latent image, a decoder will reveal the underlying latent image. Due to the high printing resolution needed for such complex scrambled lines, attempts to copy the printed image by electromechanical means, or otherwise, are most often unsuccessful in reproducing the underlying latent image.

As a result of this digital approach, several different latent mages can be scrambled and combined into an overall latent image, which can then be reformed into the rasterized source image. This is achieved by dividing the rasterized lines into the appropriate number of images (or phases) and interlacing the phased images in each raster line element. Each individual latent image might be oriented at any angle and scrambled to a different degree, so long as the scrambling of each image is a functional multiple of the known decoder frequency. Alternatively, the grey scale source image might be divided up into primary component printing colors (e.g. cyan, magenta, yellow, and black, or CMYK; red, green, blue, or RGB). Single color bitmap formats might also be used for certain applications. A scrambled latent image, or a multi-phased image, could then be individually reformed into each component color. Upon rejoining of the colors to form the final source image, the decoder will reveal the different latent images hidden in the different color segments.

The present invention also allows the option of flipping each of the elements of the latent image after it has been divided or scrambled into its elemental line parts. As has been discovered by the inventor, this unique step produces relatively sharper decoded images when each of the elements is flipped about its axis by one-hundred and eighty (180) degrees. This same effect was achieved by the process of U.S. Pat. No. 3,937,565, and the cited stereographic cameras therein, through the inherent flipping of an object when viewed past the focal point of a lens. The flipped elemental lines are then reformed into the rasterized source image. While enhancing the sharpness of the latent image, the flipping of the elements has no adverse, or even noticeable, effect on the appearance of the final coded source image. Moreover, by combining two images consisting of one image where the elements are flipped and another where they are not flipped, the appearance of a spatial separation of the two images will occur upon decoding.

As needed, the source image might simply consist of a solid color tint or a textured background which would contain hidden latent images when viewed through the proper decoder. Such solid, tinted areas might frequently be found on checks, currency, tickets, etc.

Other useful applications might include the latent encoding of a person's signature inside a source image consisting of that person's photograph. Such a technique would make it virtually impossible to produce fake ID's or driver's licenses through the common technique of replacing an existing picture with a false one. Other vital information besides the person's signature (e.g. height, weight, identification number, etc.) might also be included in the latent image for encoding into the source image.

Still other useful applications might include, for example, the following: credit cards, passports, photo-identification cards, currency, special event tickets, stocks and bond certificates, bank and travelers checks, anti-counterfeiting labels (e.g. for designer clothes, drugs, liquors, video tapes, audio CD's, cosmetics, machine parts, and pharmaceuticals), tax and postage stamps, birth certificates, vehicle restoration cards, land deed titles, and visas.

Thus, an objective of the present invention is to provide a counterfeit-deterrent method and apparatus, as implemented by a computer storage medium having a software program that runs on a computer system, for producing scrambled or coded indicia images, typically in a printed form. The coded image can then be decoded and viewed through a special lens which is matched to the software coding process parameters.

A further objective of the present invention is to provide a counterfeit-deterrent method and apparatus, as implemented by a software program on a computer system, wherein a source image is rasterized, and the latent image is broken up into corresponding elemental lines, and the rasterized source image is reconstructed according to the coded pattern of the scrambled image.

Yet a further objective of the present invention is to provide a counterfeit-deterrent method and apparatus, as implemented by a software program on a computer system, wherein the source image is converted into a grey scale image for incorporation of a latent scrambled image.

Still another objective of the present invention is to provide a counterfeit-deterrent method and apparatus, as implemented by a software program on a computer system, wherein the grey scale source image is further separated out into its component color parts for possible incorporation of latent scrambled images into each component color part, with the parts being rejoined to form the final encoded source image.

A related objective of the present invention is to provide a counterfeit-deterrent method and apparatus, as implemented by a software program on a computer system, wherein the elemental lines of the scrambled image may be rotated or flipped about their axis as necessary, or as selected by the user.

A further objective of the present invention is to provide a counterfeit-deterrent method and apparatus, as implemented by a software program on a computer system, wherein the "single phased" the scrambled image consists of a first latent image which has been sliced and scrambled as a function of a user selected decoder density and scrambling factor.

Yet another objective of the present invention is to provide a counterfeit-deterrent method and apparatus, as implemented by a software program on a computer system, wherein the "two phased" scrambled image is sliced as a function of a user selected decoder density, and each slice is halved into two sub-slices, and the first and second latent images are alternately interlaced in the sub-slices, with each latent image scrambled by a user selected scrambling factor.

Still another objective of the present invention is to provide a counterfeit-deterrent method and apparatus, as implemented by a software program on a computer system, wherein the "three phased" scrambled image is sliced as a function of a user selected decoder density, and each slice is divided into three sub-slices, and the first, second, and third latent images are alternately interlaced in the sub-slices, with each latent image scrambled by a user selected scrambling factor.

Yet another objective of the present invention is to provide a counterfeit-deterrent method and apparatus, as implemented by a software program on a computer system, wherein an "indicia tint" is produced which is similar to a two phased SI, but with one source file, and every second sub-slice of the input image is the complimenter of the first sub-slice.

A further objective of the present invention is to provide a counterfeit-deterrent method and apparatus, as implemented by a software program on a computer system, wherein the source image consists of a solid color or tint pattern with the scrambled image incorporated therein, but the elemental lines are flipped only where a letter or object occurs in underlying latent image.

Still another objective of the present invention is to provide a counterfeit-deterrent method and apparatus, as implemented by a software program on a computer system, wherein the latent image is encoded directly into a certain visible figure on the source image, thus creating a "hidden image" effect.

Yet another objective of the present invention is to provide a counterfeit-deterrent method and apparatus, as implemented by a software program on a computer system, wherein a bitmap source image is used (instead of a grey scale image) to create hidden images behind single color source images or sections of source images.

Still another related objective of the present invention is to provide a counterfeit-deterrent method and apparatus, as implemented by a software program on a computer system, wherein a multilevel, 3-dimensional relief effect is created by applying different scrambling parameters to an image and its background.

Another related objective of the present invention is to provide a counterfeit-deterrent method and apparatus, as implemented by a software program on a computer system, wherein "void tint" sections might be produced and the word "void," or similar such words, would appear across documents if attempts are made to photocopy them.

Yet another possible objective of the present invention is to use the software program and computer system to produce the equivalent of "water marks" on paper products.

Still another possible objective of the present invention is to use the software program and computer system to produce, or to aid in producing, holographic images through line diffraction techniques.

Another embodiment of the invention is to disclose a device and method of security printing and object authentication by encoding an ordinarily recognizable indicium, i.e., a distinctive mark, by forming a parallax panoramagram image of the recognizable indicium through a lenticular line screen. The resulting encoded image is a scrambled lineticular dissection of an image of the recognizable indicium. The scrambled image is then transformed into a diffraction-based image, such as a hologram.

The device enhances documentary security and object authentication by use of an encoded parallax panoramagram and means defining an embossed diffracting surface incorporating the encoded parallax panoramagram, the portion of that surface which incorporating the panoramagram having light-diffracting properties different than the light-diffracting properties of adjacent portions of the surface. In one embodiment of the invention, that surface includes a hologram. In another embodiment that portion of said surface incorporating the panoramagram is embossed with a diffraction grating. The encoded parallax panoramagram is preferable formed by use of a digital printer in a manner similar to the aforementioned embodiment.

Surprisingly, although one might expect that rendering Scrambled Indicia® type images in a form based upon diffraction of light would seriously impair or prevent decoding through the usual simple lenticular screen, such decoding nevertheless remains completely unimpaired and the system retains the same ease and simplicity of use of the original Scrambled Indicia® system notwithstanding that another order of security has been imposed on the system.

The method also includes the step of forming a security graphic image by at least juxtaposing an unencoded graphic and the encoded indicium to form a composite image, a diffraction grating having diffractive properties that vary in accordance with intensity variation in the composite image. The composite image includes copy-resistant content, such as a guilloche. In another embodiment, the encoded indicium is unobtrusively incorporated substantially within the unencoded graphic so as to induce a viewer of the security graphic image to believe that the encoded indicium is a feature of the unencoded graphic.

In another preferred embodiment, a diffraction grating is created by forming a reflective surface that includes a first plurality of regions of a diffraction grating of a first brazing angle, and a second plurality of regions of a diffraction grating of a second brazing angles, the first and second plurality of regions being distributed over the reflective surface so as to form the final security graphic image.

In all cases, the encoded indicium of the security graphic image can be encoded to authenticate the security graphic image using a decoder that is substantially a duplicate of the lenticular line screen used for the encoded indicium.

The invention also includes a method for security printing and object authentication wherein an embossed hologram is created that includes a surface with diffractive properties that vary over the surface in accordance with intensity variations in an unencoded graphic image, and then a security graphic image is formed by embossing the embossed hologram with a die having a plurality of regions raised in relief so as to form a diffraction grating having distinct diffraction properties within each region, and distributed in accordance with an encoded indicium.

The invention also includes a method for security printing and object authentication where in an embossed hologram is created having a surface with diffractive properties that vary the surface in accordance with intensity variations in a security graphic image that includes an encoded indicium.

It is a general object of the alternate embodiment of the present invention to provide a device and a method for enhancing documentary security and object authentication based upon principle of optics of the type described that significantly overcomes the problems of the prior art.

A more specific object of the present invention is to provide means for significantly reducing the likelihood of counterfeiting and unauthorized modification of documentary security and object authentication devices based upon diffraction of light, such as holograms, KINEGRAMS®, and blazed reflection phase gratings.

Another object of the invention is to provide means for thwarting unauthorized reproduction by sophisticate optical techniques of diffraction-based documentary security and object authentication devices.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 6 shows a series comparison of scrambled images as a function of increasing lens frequency (or line density per inch) from 10 through 100.

FIG. 14 (a) shows the choices resulting from clicking on the File Menu option.

FIG. 14(b) shows the resulting screen when either load or save is selected from the File Menu option.

FIG. 18(a) shows an "indicia tint" example of slicing the output image, wherein the width of the slice is one half of the one phase example, with every other sub-slice being the complimenter of the previous sub-slice input.

FIG. 23 is illustrative of prior art in which FIG. 23 is an example of a recognizable indicium; FIG. 23B is an example of the recognizable indicium of FIG. 23 after being encoded as a parallax panoramagram image that is a lineticular dissection of the recognizable indicium; FIG. 23C is a lenticular screen used to create the parallax panoramagram image of FIG. 23B; FIG. 23D is an enlarged partial cross-section of a lenticular screen for decoding the indicium of FIG. 23B; FIG. 23E illustrates the decoded or unscrambled recognizable indicium as it appears to a viewer through the lenticular screen of FIG. 23D

DETAILED DESCRIPTION OF THE PREFERRED EMBODIMENT

Although the invention has been described in terms a specific embodiment with certain alternatives, it will be readily apparent to those skilled in this art that various modifications, rearrangements and substitutions can be made without departing from the spirit of the invention. The scope of the invention is defined by the claims appended hereto.

The Scrambled Indicia (SI) process involves rasterizing, or dividing up into lines, a source or visible image according to the frequency (or density) of a lenticular decoder lens. The number of lines is also a function of the scrambling factor, or zoom factor, as applied to a latent or secondary image. After the latent image is processed and scrambled, a set of scrambled lines exists which can then be combined into the rasterized lines of the visible image. The visible image is thus reformed, or re-rasterized, according to the pattern of the scrambled latent image lines. Where the visible image is darker, the scrambled lines are made proportionately thicker in re-forming the rasterized lines of the visible image; similarly, where the visible image is lighter, the scrambled lines are made proportionately thinner. As a result, a new visible image is created, but with the encoded, latent, SI pattern being visible "underneath" when viewed through a transparent decoder lens.

Figure 1:
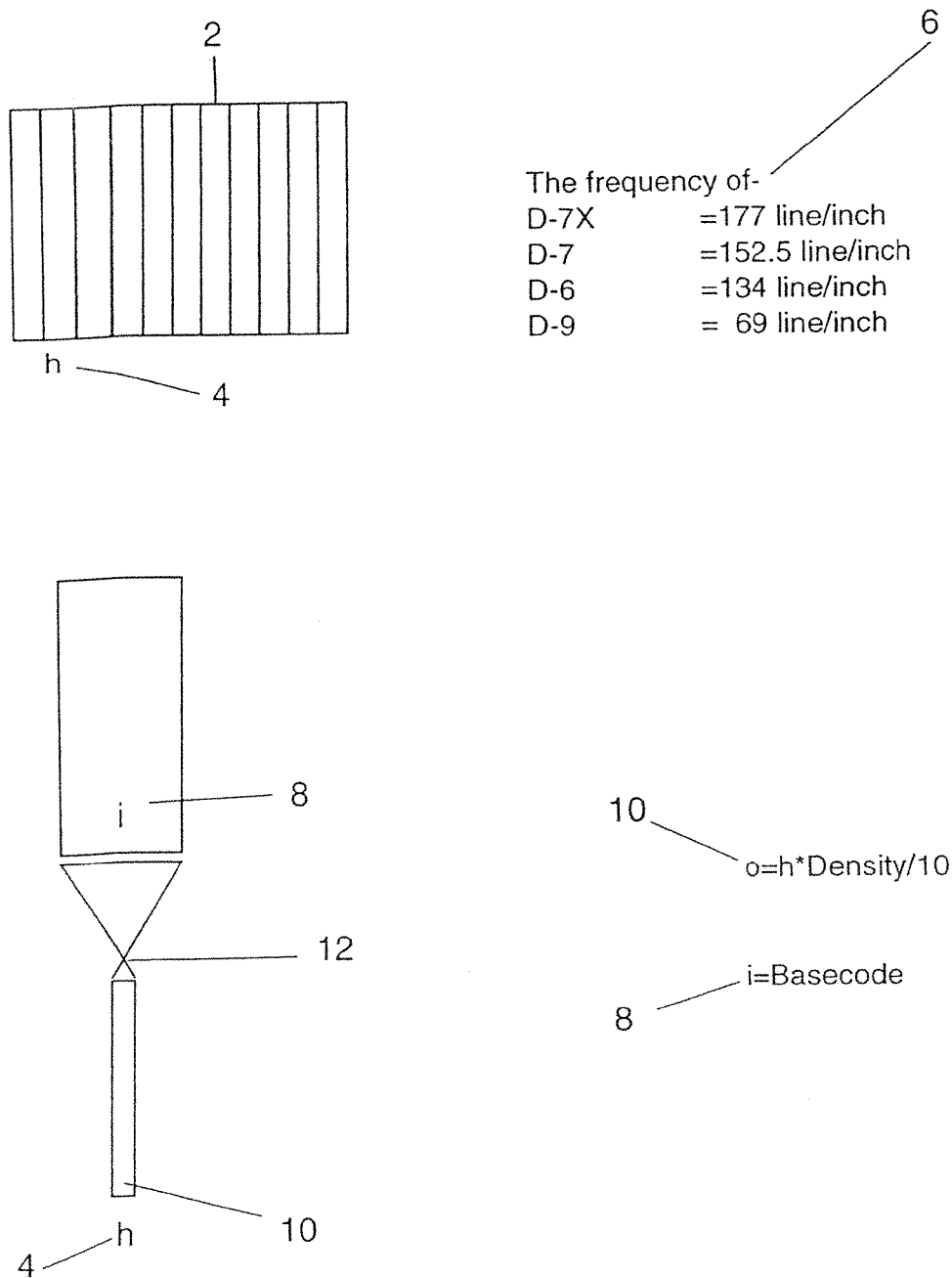
FIG. 1 shows a "one phase" example of the Scrambled Indicia (SI) process wherein an output image is sliced into elements as a function of the frequency of the decoding lens and the scrambling factor (or zoom factor, or base code) as selected by the user.

Referring now to FIG. 1, certain example details of the process are shown. In this example, one latent image is processed into a visible source image, and this process is generally referred to as a "one phase" SI operation. In any SI operation, an output image is a function of the decoder lens density. An output image is shown which is sliced up into elemental slices, or segments, of width h. (See reference 4). Each slice width h is a function of several factors such as density and base code.

As for lens density, the inventor has assigned reference names to lenses with various frequencies (or line densities per inch), including for instance, the following: D-7X with 177 lines/inch; D-7 with 15.5 lines/inch; D-6 with 134 lines/inch; D-9 with 69 lines/inch. (See reference 6). The software for performing this process also provides an "x" (or doubling factor, df) option which doubles the effective line density, and hence divides the output image up into twice as many slices. The resulting SI image will still be decodable by the selected lens because the number of lines is an even multiple of the frequency of the lens.

The output image slice, having width h, is processed as a function of the input slice width i (see reference 8). In turn, width i is a function of width h, the lens density, and a base code factor (or scrambling factor) as selected by the user. These formulas are as follows:

$df$=(if "$x$" selected); 1 (by default)

$o=h$*density/100 (See reference 10)

$i=o$*base code($B$) (See reference 8)

Rearranging these formulas, the value for h becomes:

$$h = \frac{(1/B)*100}{\text{Density}*df}$$

Hence, as the value for the base code and/or the density is increased, the width h will decrease. A larger base code, or scrambling factor, therefore creates more lines and results in a more distorted or scrambled image.

Figure 2:
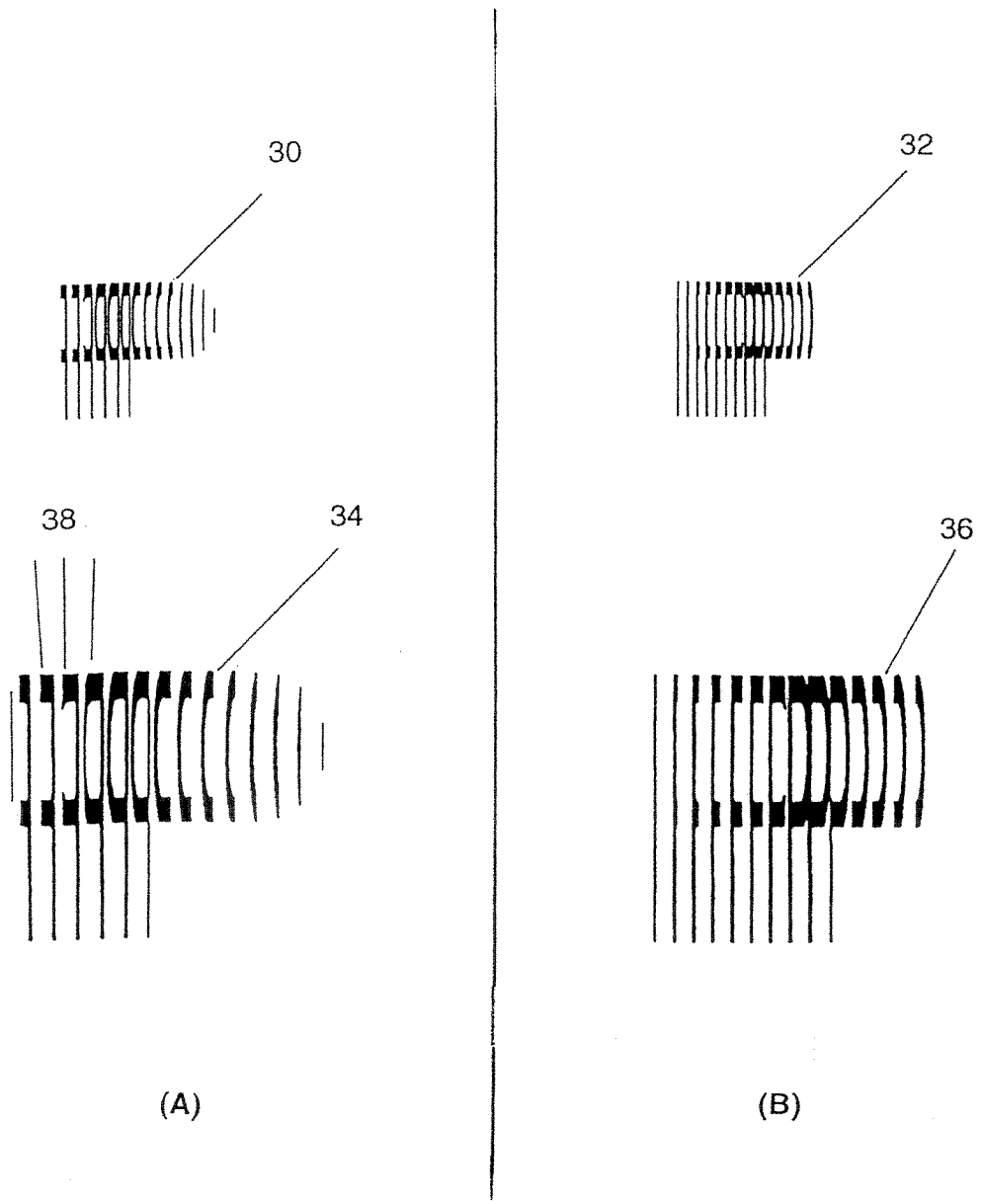
FIG. 2(a) shows a scrambled "P" (above) with its resulting elements enlarged 400% (below) wherein the elements have been flipped 180 degrees about their vertical axes.
FIG. 2(b) shows the scrambled "P" (above) of FIG. 9(a) with its resulting elements enlarged 400% (below) wherein the elements have not been flipped or altered.

Additionally, the SI process allows the option of flipping 12 the input slice to affect the sharpness of the image. Referring now to FIG. 2(*a*), the letter "P" is shown scrambled 30 according to the SI process. An image 34 enlarge by 400% further shows the characteristic elements 38. In this instance the elements have each been individually flipped 180 degrees about their vertical axis. FIG. 2(*b*) shows the same example "P" 3, and enlarged version 36 where the elements have not been flipped. When viewed through the proper decoder lens for these particular SI parameters, the flipped "P" will appear sharper, or more visually distinct, than the unflipped "P". For any scrambled image, the software provides the user the option of flipping or not flipping the elements, as further detailed below.

Figure 3:
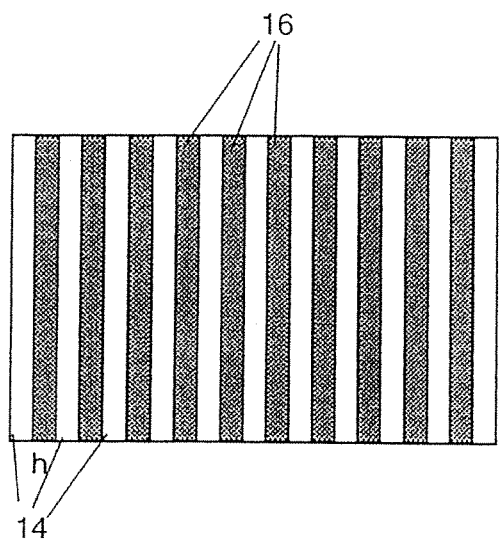
FIG. 3 shows a "two phase" SI example of slicing the output image, wherein the width of the slice is one half of the one phase example, with every odd slice being from a 'source one' file, and every even slice being from a 'source two' file.

Referring now to FIG. 3, a "two phase" SI process is shown whereby the method is similar to that for the one phase SI. In this case, however, each slice of width h is further divided into a first and second sub-slice. The elemental lines of first and second scrambled images will be stored by the software program in 'source one' and 'source two' files. In the resulting output image, the odd slices 14 are composed of elemental lines from the source one file, and the even slices 16 are from the source two file. Upon decoding, the first and second scrambled images will appear independently discernable.

Figure 4:
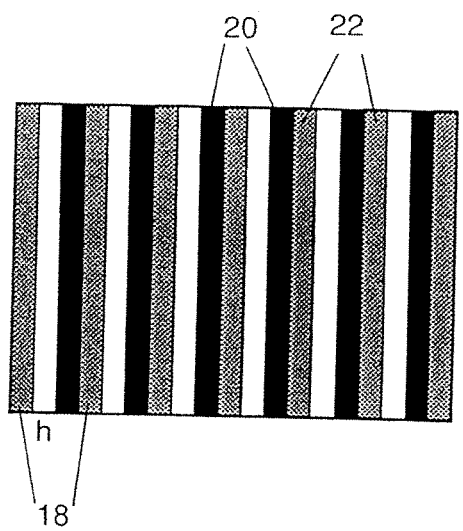
FIG. 4 shows a "three phase" SI example of slicing the output image, wherein the width of the slice is one third of the one phase example, with every third slice being from the same source input file.

Referring now to FIG. 4, a "three phase" SI process is shown as similar to the one and two phase SI processes. In this case, width h is divided into three parts. The first, second, and third scrambled images are stored in three computer source files. In the resulting output image, every third slice 18, 20, and 22 comes from the same respective first, second, or third source file. Again upon decoding, the first, second, and third scrambled images will appear independently discernable.

Figure 5:
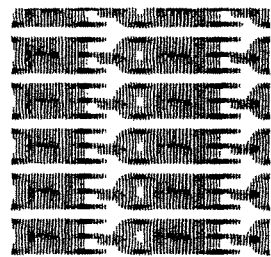
FIG. 5 shows a comparison of the one, two, and three phase scrambled and coded results.
Figure 5:
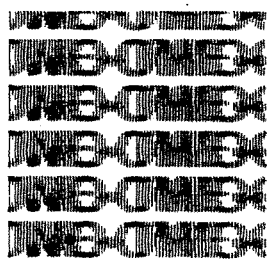
Figure 5:
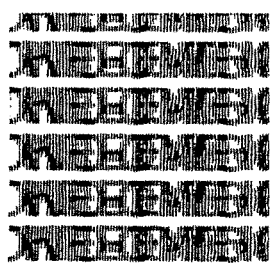
Figure 6:
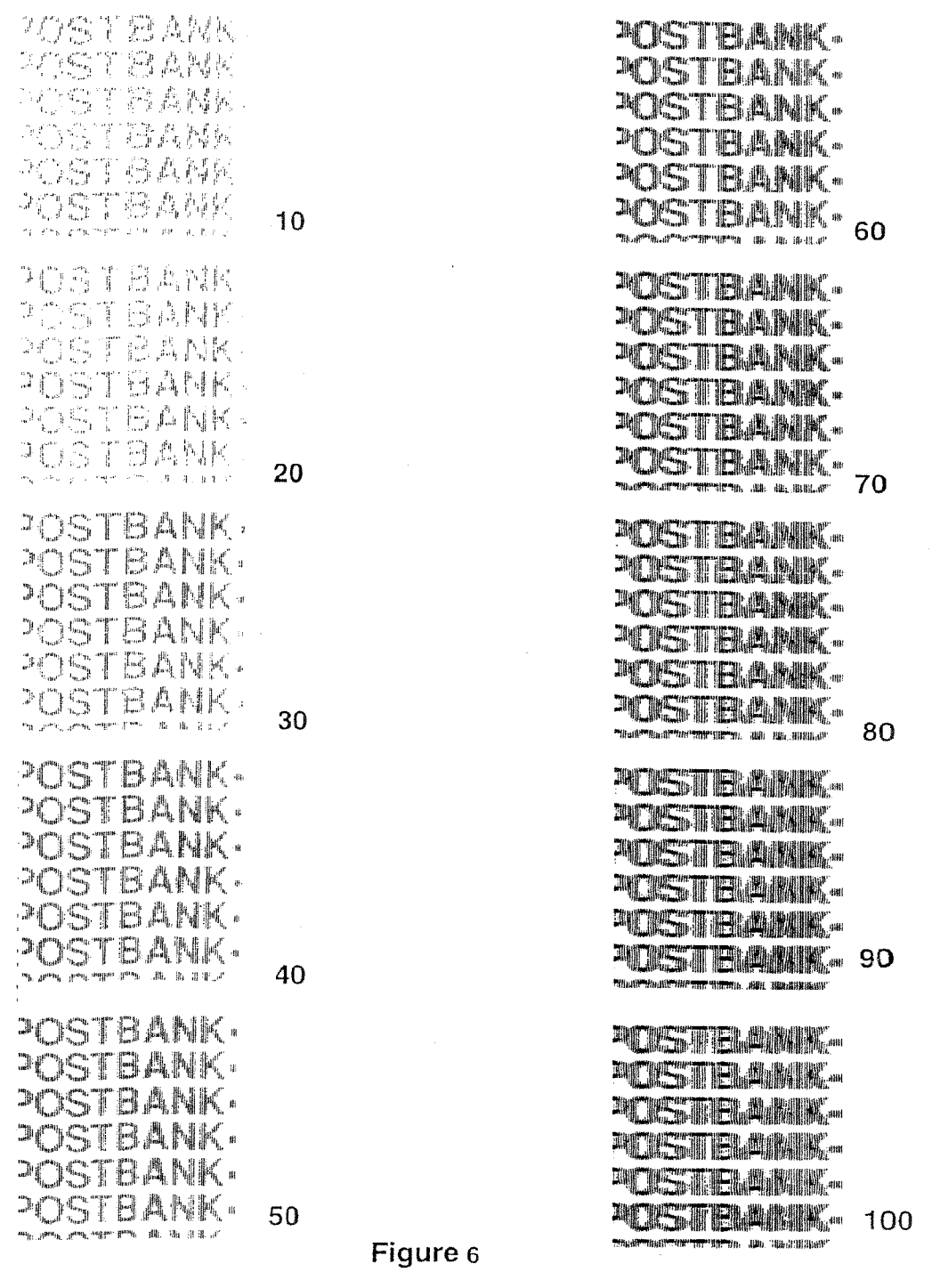
Figure 7:
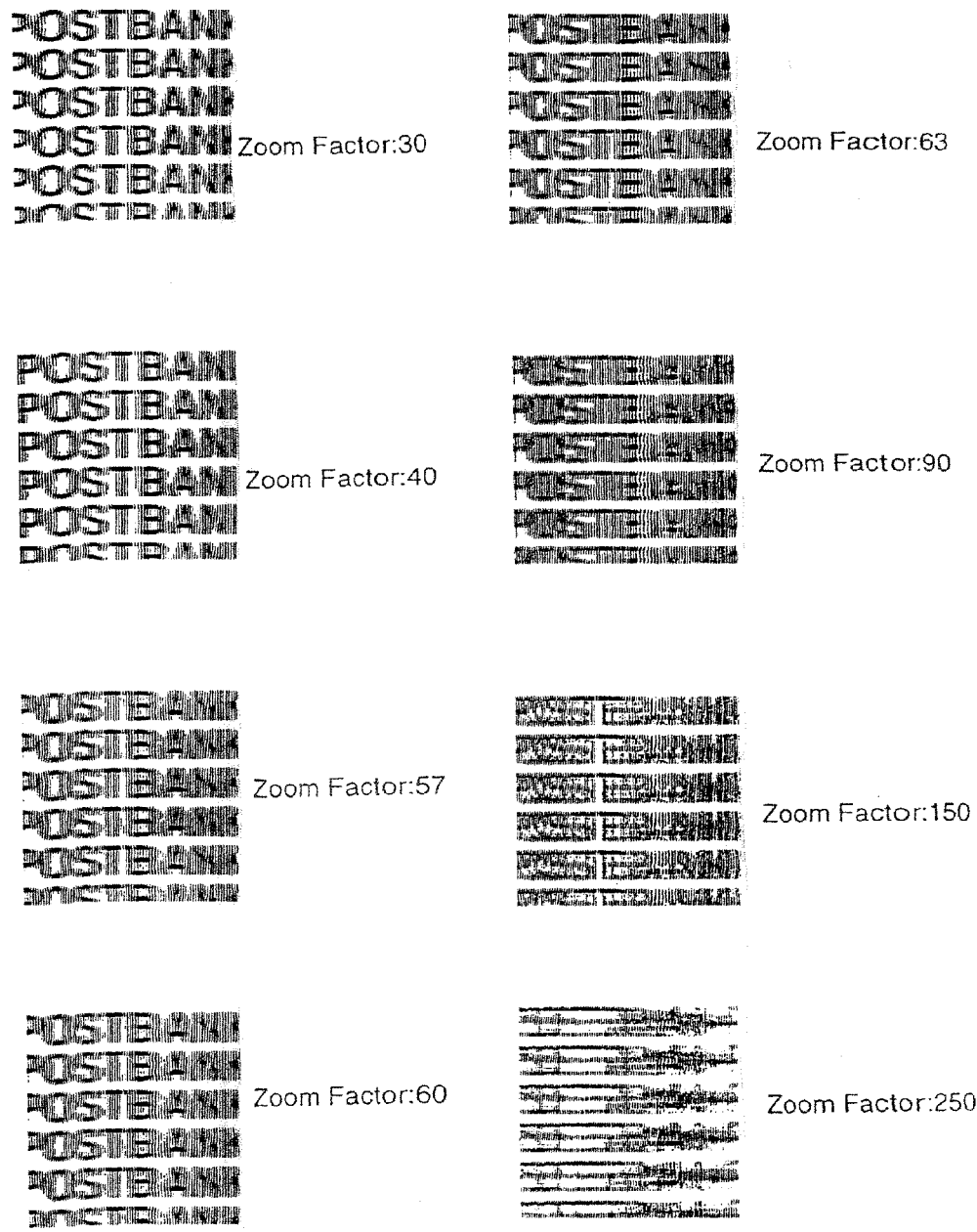
FIG. 7 shows a series comparison of scrambled images as a function of increasing zoom factor (or base code) ranging from 30 through 50, for a given lens frequency.

Referring to FIG. 5, a comparison is shown of the one, two, and three phase scrambled results for a given lens density and base code. FIG. 6 shows a comparison of the scrambled results for a given base code and a varying set of lens densities ranging from 10 through 100 lines per inch. As the lens density increases, the relatively width of each elemental line decreases and causes the scrambled image to be harder to discern. In FIG. 7, the lens density is fixed while the zoom factor, or base code, is increased through a series of values ranging from 30-50. Similarly as per the formulas above, as the base code is creased, the relative width of each elemental line decreases and causes the scrambled image to be harder to discern. As shown, the discernability of the scrambled image for a zoom factor of 30 is far greater than for a zoom factor of 250.

Figure 8:
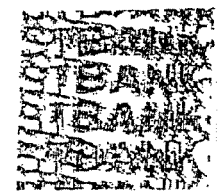
FIG. 8 shows a series comparison of two phased scrambled images wherein the first latent image and the second latent image are rotated with respect to each other ranging from 10 through 90 degrees.
Figure 8:
Figure 8:
Figure 8:
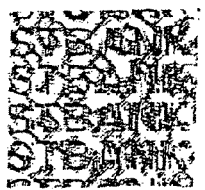
Figure 8:
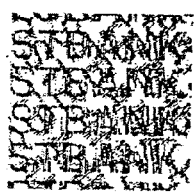
Figure 8:
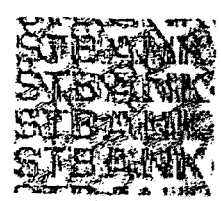
Figure 8:
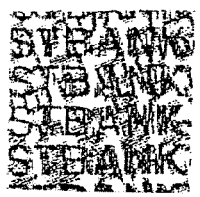
Figure 8:
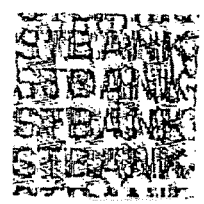
Figure 8:
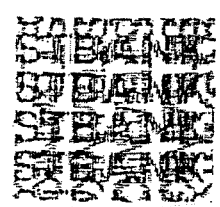

Another benefit or feature of multiple phasing is that each latent image can be oriented at a different angle for added security. Referring now to FIG. 8, a series of two phase images is shown where the first latent image remains fixed and the second latent image is rotated, relative to the first image, through a series of angles ranging from 10-90 degrees.

Figure 9:
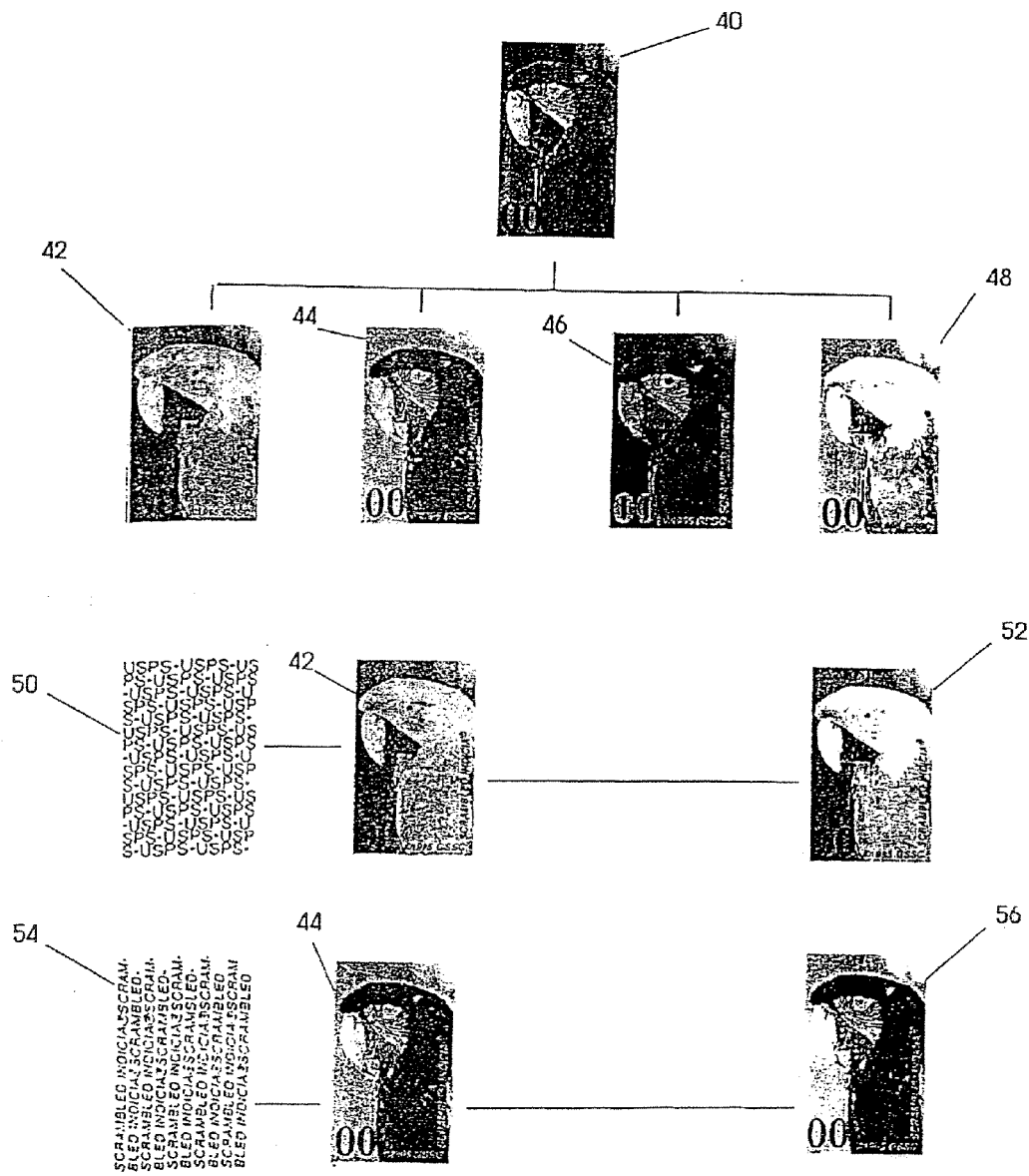
FIG. 9 shows the steps involved to encode, as hidden images, two separate scrambled indicia patterns into two separate base colors as extracted from the original source image.

Referring now to FIG. 9, an example of the versatility offered by a software version of the SI process is shown. In this example, a postage stamp is created whereby the SI process incorporates two different latent images, oriented 90 degrees to each other, into two different base colors of the visible source image. The visible source image—as comprised of its original RGB colors—is scanned, as a digital high resolution image, into a program such as ADOBE PHOTOSHOP. The image is then divided into its component color "plates" in yet another commonly used color format CMYK, wherein the component images of Cyan 4, Magenta 44, Yellow 46, and Black 48 are shown. The versatility of the SI software allows for the easy combination of a latent SI image with any one component color of the visible image. In this case, the latent invisible image 50 with the repeated symbol USPS is scrambled and merged with the Cyan color plate 4. The resulting Cyan color plate 5—as described above—will show the original visible image in a rasterized pattern to the unaided eye, but the latent invisible image will be encoded into the rasterized pattern. A second latent invisible image 54 with the repeated trademark SCRAMBLED INDICIA (of this inventor) is merged with the Magenta color plate 44 to produce the encoded Magenta image 56. The final visible image (similar to 40) will then be re-composed using the original Yellow and Black plates along with the encoded Cyan and Magenta plates.

Figure 10:
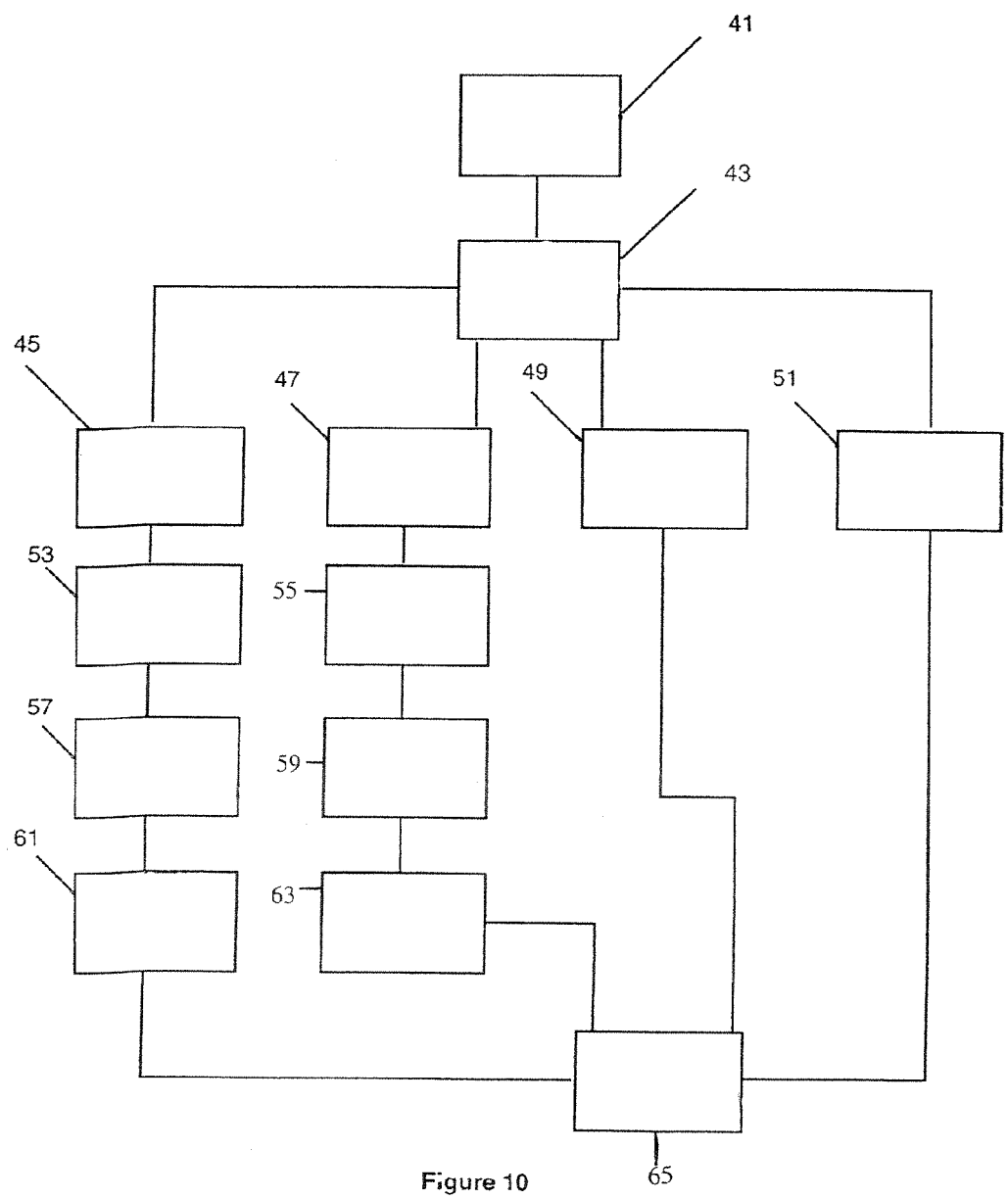
FIG. 10 shows a flow chart of the steps relating to the process as shown in FIG. 9.

Referring now to FIG. 10, an example flow chart of the steps performed by the SI software in FIG. 10 are shown. The source image is first digitized 41 and then divided out into its component CMYK colors 43. Each color plate 45, 47 49, and 51 can be independently operated on by any of the SI process implemented. In this case, a hidden image technique (or rasterization in single color) is performed. The target color plates are rasterized 53, 55 and the SI scrambling process is applied to the first latent image 57 and the second latent image 59. The first scrambled image is then merged with the rasterized Cyan color plate 61 and the second scrambled image is merged with the rasterized Magenta color plate 63. The final output image is a created by re-joining the encoded Cyan and Magenta color plates with the unaltered Yellow and Black color plates 65. In this example, only the Cyan and Magenta colors were encoded. Other examples might choose to encode one color, three colors, or all four colors.

Figure 11:
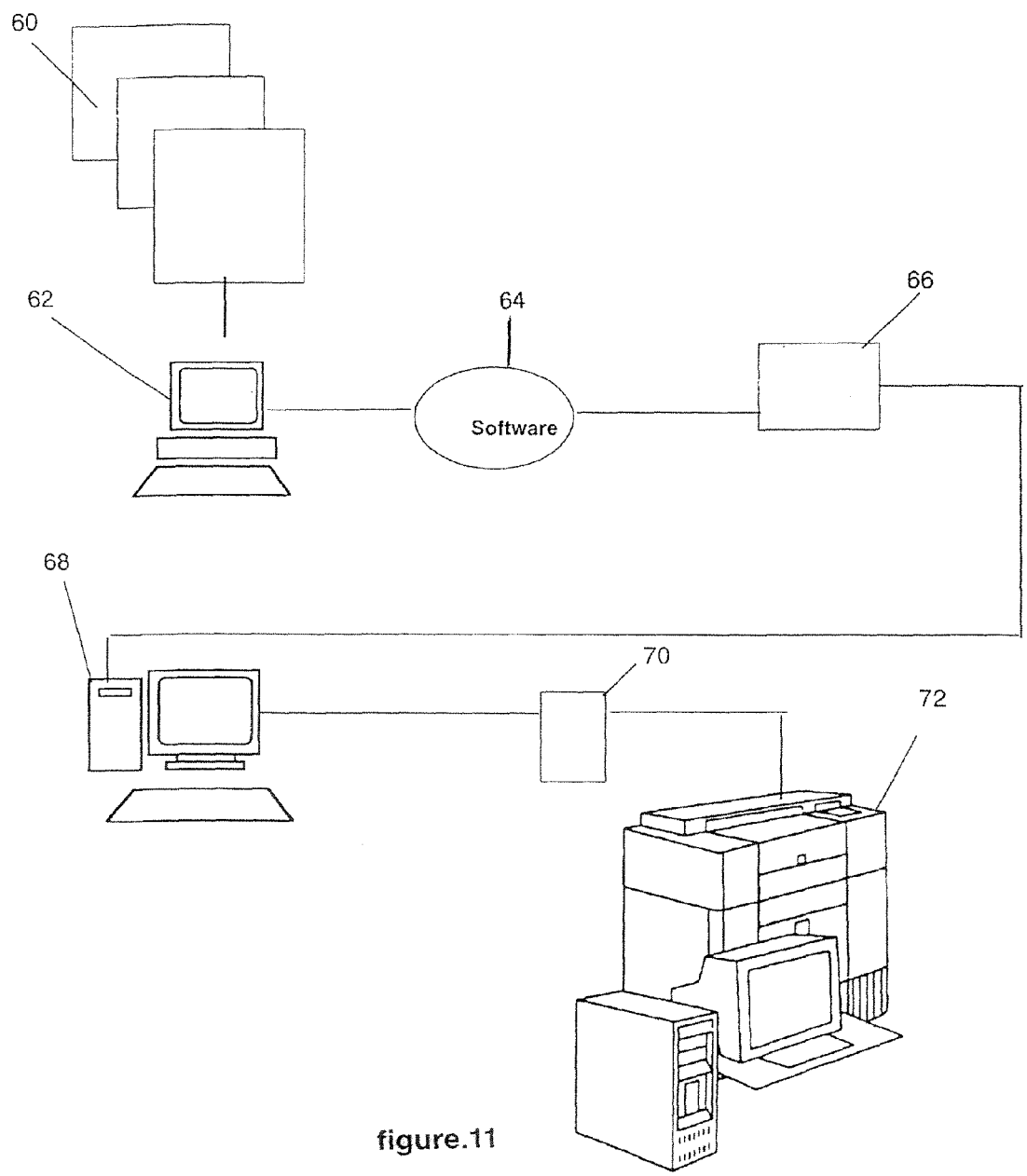
FIG. 11 shows an example hardware configuration for running the SI software and performing the SI process.

While this process might be implemented on any computer system, the preferred embodiment uses a setup as shown in FIG. 11. Various image files, as stored in "tif" format 60, are fed into a SILICON GRAPHICS INC. (SGI) workstation 6 which runs the SI software. While the software might run on any computer capable of handling high resolution graphics, the SGI machine is used because of its superior speed and graphical abilities. The files are opened by the SI software and the scrambled indicia types, values, and parameters are set by the program user 64. Encoding algorithms are applied by the SI software to merge latent images with visible images to create a new scrambled "tif" file 66. The new "tif" file is then fed into a MACINTOSH computer 68 for implementation into the final design program, wherein the file is converted into an Encapsulated PostScript (EPS) file format 70. The finished design is then sent to an output device of choice 7 which is capable of printing the final image with the resolution necessary to maintain and reveal the hidden latent images upon decoding. The preferred output device is manufactured by SCITEX DOLVE.

Figure 12A:
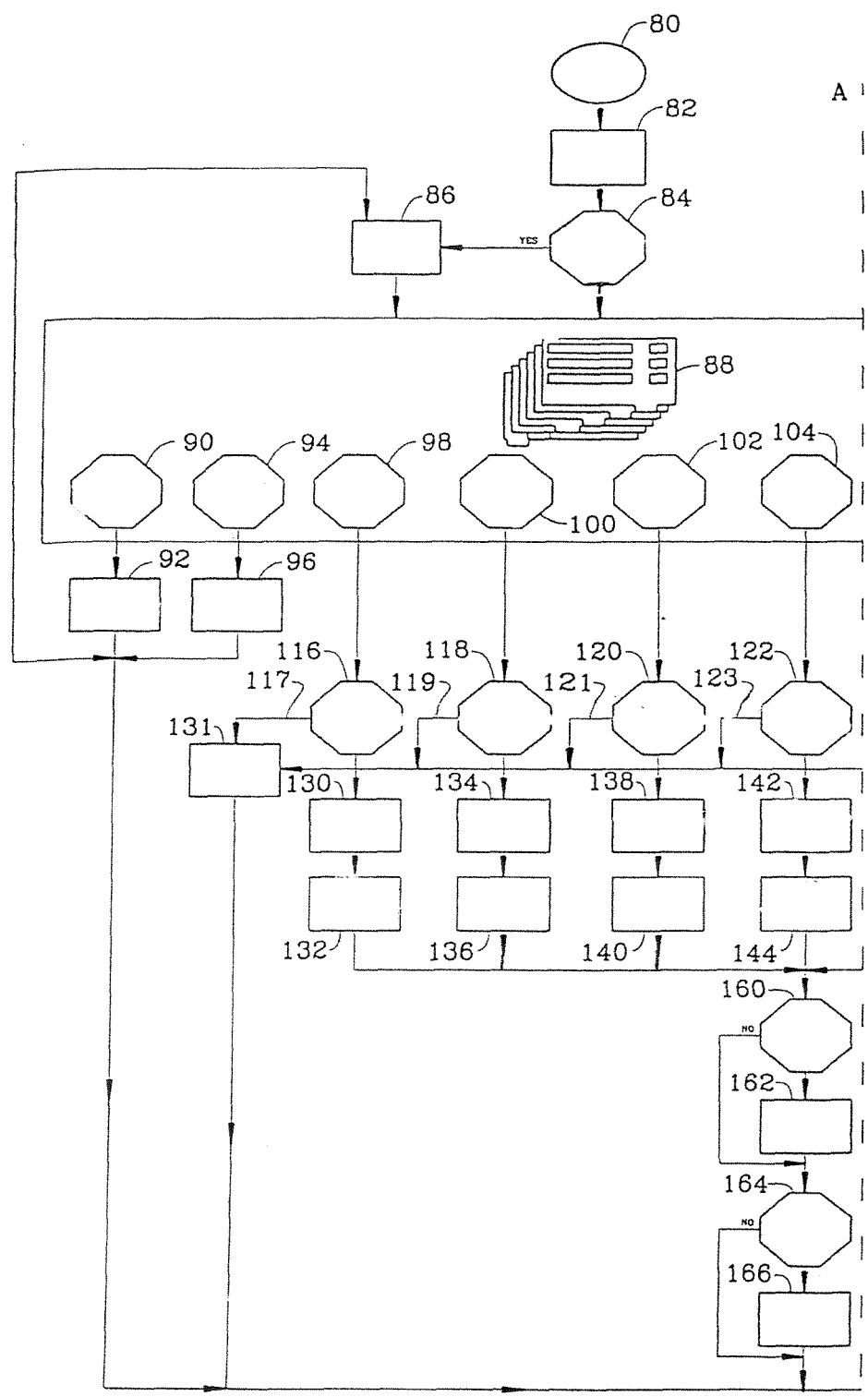
FIG. 12A is a first portion of a flow chart of the overall operation of the S.I. software.
Figure 12B:
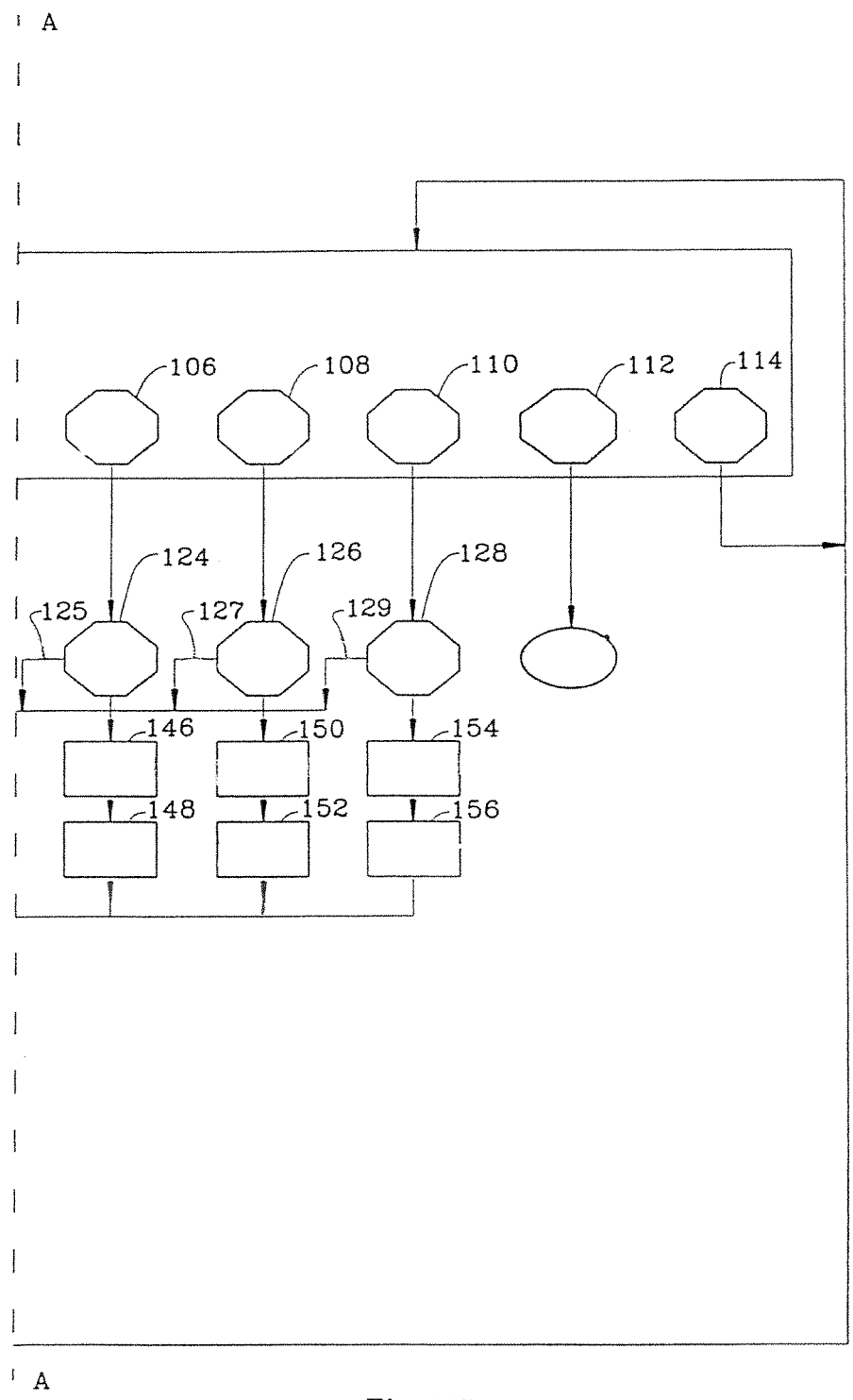
FIG. 12B is a second portion of a flow chart of the overall operation of the S.I. software.

Referring now to FIGS. 12A and 12B, a flow chart of the overall operation of the SI Software is shown. Upon entering the program 80, a set of interface settings are either created 8, or read 86 from a default file 84. The user is then presented with a series of input screens for selecting the type of SI process to perform, along with the related parameters for performing such an operation. One option might be to save the settings already selected 90 into a user selected file 9. A related option would be to load settings already saved 94 into a user selected file 96.

As already described, the user might choose to perform a one, two, or three phase SI process. Accordingly, the user would indicate the appropriate source files on which to perform the SI process and indicate that such a one, two, or three phase calculation (shown as 98, 100, and 10) should be performed. Other SI operations which could be selected for calculation, would include a "tint" method 104, a "hidden" method 106, a "multilevel" method 108, and a "raster" method 110. Otherwise, the user might choose to exit the program 11, or re-enter the selection process 114.

Upon transitioning past the selection process, the program checks 166-18 the various input settings selected the user. The program detects errors 117-19 relating to each selection, and displays an appropriate error message 131 as appropriate. Based upon the input settings selected, the various operations will be performed, e.g. scramble with one phase method 130 and save the one phase results to an output file 13; scramble with two phase method 134 and save the two phase results to an output file 136; scramble with three phase method and save the three phase results to an output file 140; scramble with tint method 14 and save the tint method results to an output file 144; scramble with hidden method 146 and save the hidden results to an output file 148; scramble with multilevel method 150 and save the multilevel results to an output file 15; or scramble with raster method 154 and save the raster results into an output file 156. The results of any of these methods can then be displayed and viewed 160 (if desired) via a resulting viewer window 16. Tonal sound indicators 166 can also indicate the progress of the software if selected 164.

Figure 13:
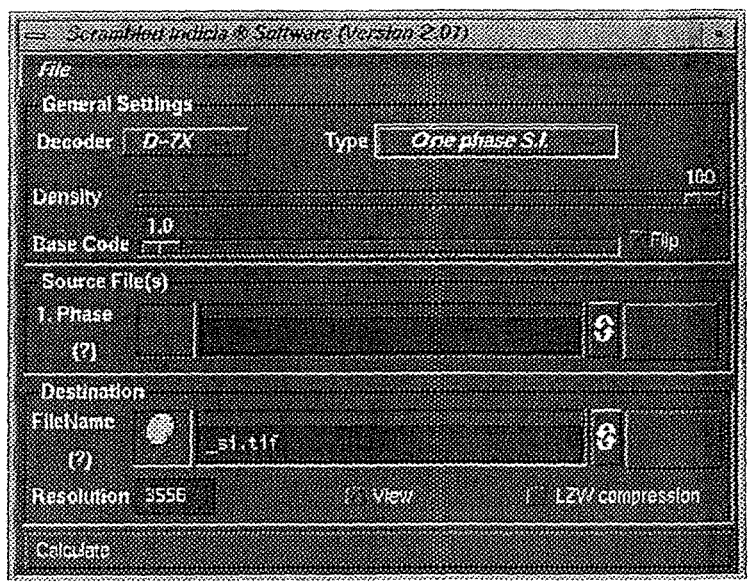
FIG. 13 the introductory screen for the scrambled indicia software (SIS).

The SI software uses a variety of user interface screens which facilitates choosing which type of SI process will be performed, and under which parametric conditions. FIG. 13 shows the introductory screen upon entering the SIS program which shows the user the ownership rights associated with the program. The user interface for the SIS is based upon the "X window" environment. It is similar to most GUI (Graphical User Interfaces). When the user moves the mouse pointer to a choice field and holds the mouse button down, the user will get a pop down or pop up window. This window will allow the user to make even more choices.

Figure 14:
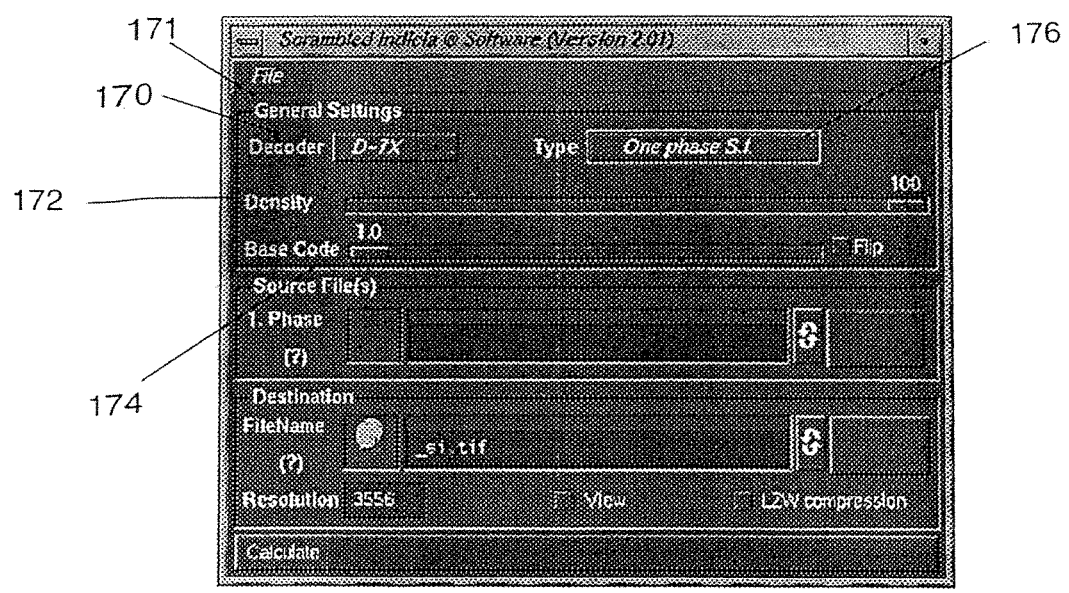
FIG. 14 shows the series of options appearing on the generalized screen for a one phase type SI selection.
Figure 14:
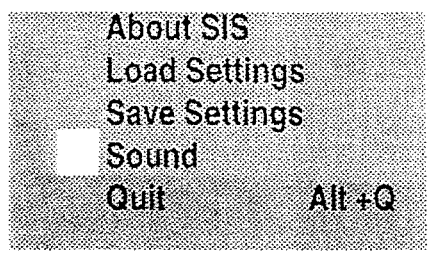
Figure 14:
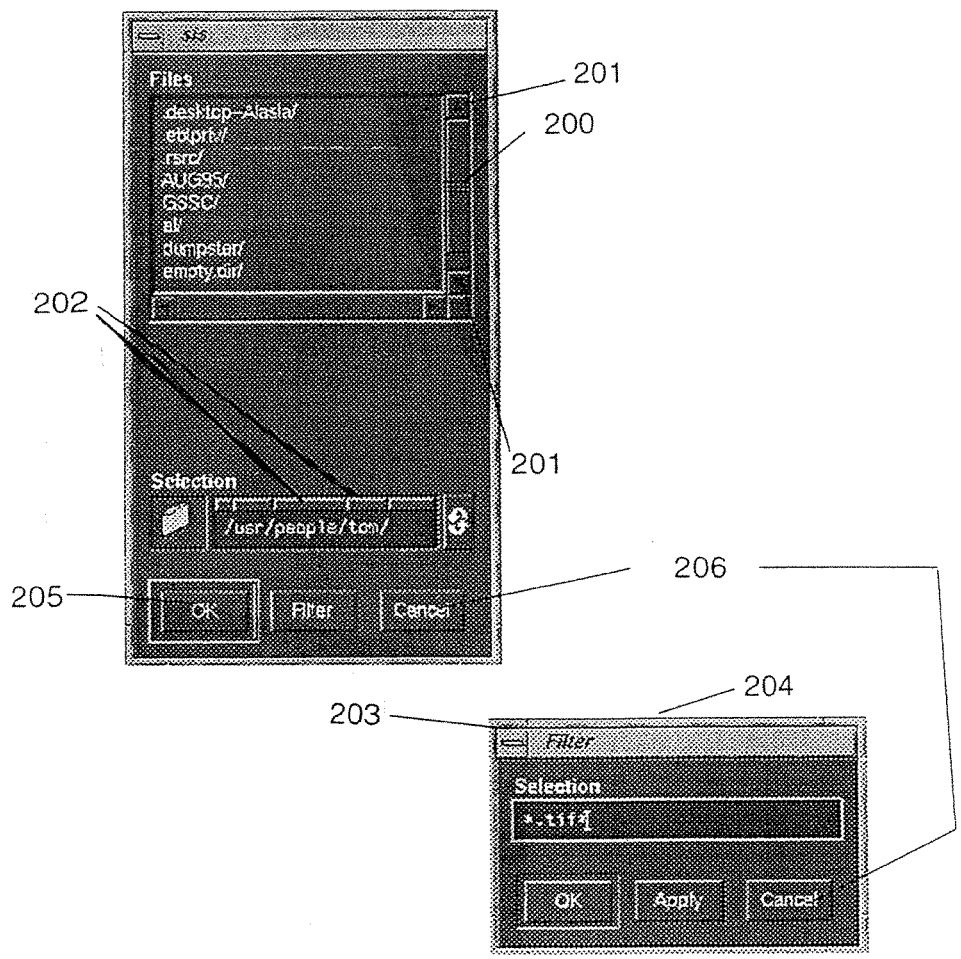

FIG. 14 shows the basic user interface screen associated with performing an SI operation. When the user clicks on the File Menu option, the choices in FIG. 14 (*a*) will appear (e.g. About SIS, Load Settings, Save Settings, Sound, and Quit). When the user chooses either load or save from the file menu, the screen in FIG. 14(*b*) will appear. The user may drag the slider bar 00 or click on the arrow keys 01 to move through the list of available files. Moreover, the user can use the directory bar buttons 0 to shift backwards in the shown directory hierarchy. The "filter" button 03 brings up another window 04 which allows the user to specify which type of files to view; for instance the "wildcard" designator "*" could be used with "*.tif" to bring up all "tif" files for possible selection from among the listed files. Once the desired file is found, the "OK" button 05 accepts and loads/saves the file. Either cancel button 06 ends the current operation.

Furthermore, if the user activates the Sound setting, the SIS program will provide verbal cues to let the user know what's going on; otherwise, the SIS program will remain silent during operation. The user can quit the SIS software at anytime by selecting quit, or executing an Alt-Q keystroke.

Referring again to FIG. 14, the "decoder" box 170 shows the type of decoder selected (e.g. D-7X). The "type" box shows the scramble type 176 selected (e.g. one phase SI, two phase SI, hidden image SI, etc.). The "density" slider bar 17 allows the user to control the line weight of the image that is created during the encoding process. The feature will affect both the "positive" (darkened) and "negative" (white) space of the object being encoded. This value can be adjusted based upon what you are encoding and what the final print destination will be. The "base code" slider bar 174 allows the user to control the amount of scramble that is applied during the encoding stage, as described above. The "flip" box allows the user to turn each individual scrambled element by 180 degrees about its vertical axis. This option helps hide the original item when that item is of a simple enough nature to see even after the scramble. In other words, sometimes when scrambling a single word or a few characters, the letters are still discernable despite the scrambling process applied. By flipping the elements, a deeper scramble can often be achieved which can still be decoded by the same lens. Also, as mentioned before, flipping the elements often produces a sharper decoded character.

Figures 15, 15A:
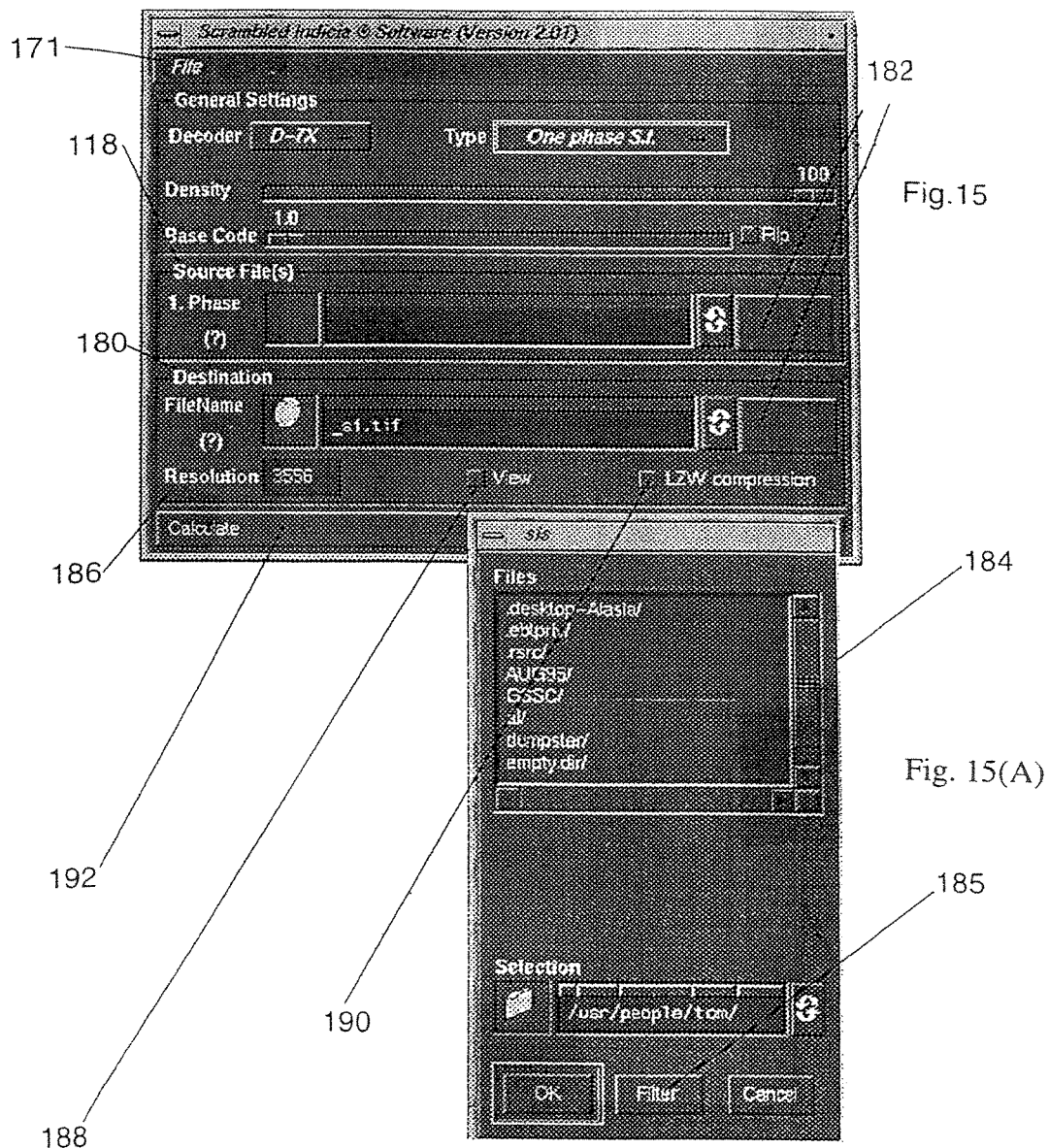
FIG. 15 shows and details further options of the generalized screen for a one phase SI selection.
FIG. 15(a) shows the Browse option screen as selected from the screen shown in FIG. 15.

FIG. 15 shows the same basic user interface screen with further explanations of user interface boxes. The "source file" box 178 allows the user to directly enter the file name to which the program is applying the scramble. The "destination file" box 180 allows the user to directly enter the name of the file for the finished output. Both the source file and destination file boxes have "browse" buttons 18 which pull up yet another box 184 (FIG. 15(*a*)) for selecting possible source and destination files. In the browse box, the user may use arrows, or the slider bar, to scroll through the file directories and locate and select a particular file. The "filter" box 185 allows the user to select a specific file name and have the program search for it. The "resolution" box 186 indicates the resolution of the final output image. This number should be matched to the resolution of the destination printing device. The "view" option box 188 allows the user to decide whether or not to see the scrambled image upon completion' of the SI calculation. The "LZW" option box 190 allows the user to save files using compression. Compression keeps the overall size of the files smaller and conserves disk storage space. The "calculate" button 19 allows the user to click on this bar when ready to finally apply the SI scrambling process.

Figure 16:
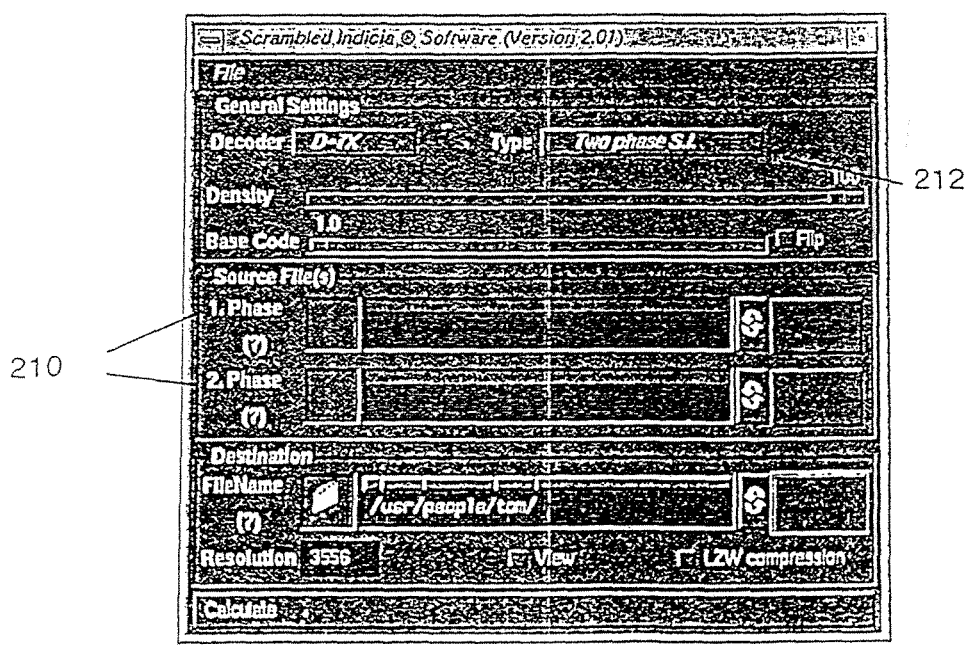
FIG. 16 shows the generalized screen for a two phase type SI selection.

FIG. 16 shows a similar screen for performing a two phase SI operation. However, this screen provides entry boxes for two source files 10, where the latent images are interlaced into a two phased scrambled image. With the two phased example, the user can select a different base code for each image. This is especially useful when the user wants to create an overlay of two different sets of text that will be viewed together, yet be seen as separate words when decoded. A "restraint" option box 1 is provided for linking the first and second images together whereby the same base code will be applied to each image. The remainder of the options are similar to those described above.

Figure 17:
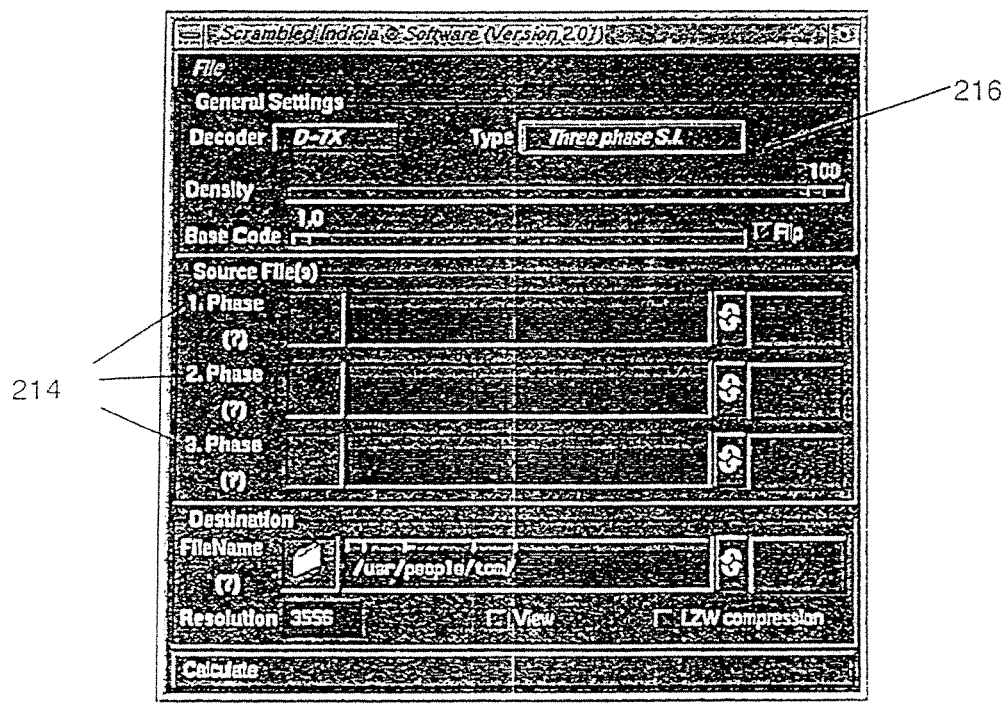
FIG. 17 shows the generalized screen for a three phase type SI selection.

FIG. 17 shows a similar screen for performing a three phase SI operation. This screen provides three source file input boxes 14 wherein each input image can have a different base code applied, or the same base code can be applied to all by activating the restraint option 16.

Figure 18:
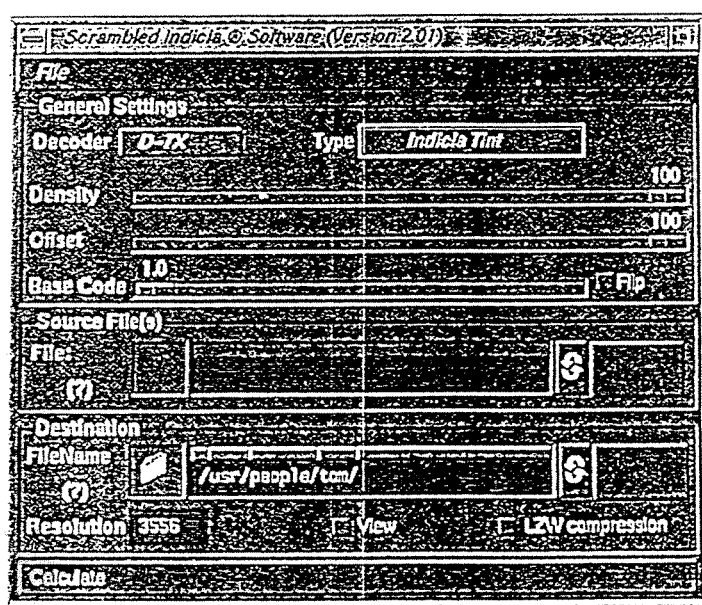
FIG. 18 shows the generalized screen for an indicia tint type SI selection.
Figure 18:
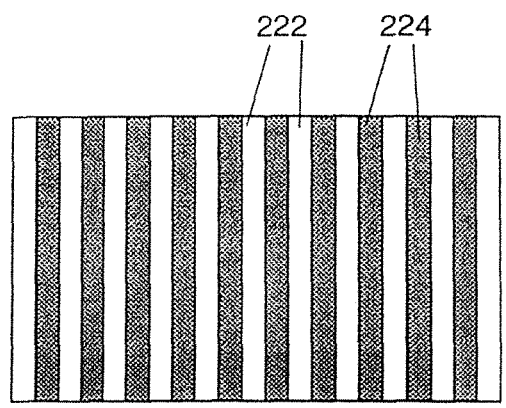

Referring now to FIG. 18 the interface screen for performing an "indicia tint" operation is shown. Unlike the hidden image SI (below), the indicia tint will flow as smoothly as possible through the image, ignoring tonal variations. This image might be thought of as a "monotone scramble." Referring now to FIG. 18(*a*), an output image is shown (similar to FIG. 2) which is similar to a two phase SI, but with only one input file. In this instance, every second sub-slice, 4 of the output image is the complimenter of the immediate previous input sub-slice. The complimenter means, for example, that when the input is black, the complimenter is white, if the input is red, the complimenter is cyan, etc.

Figure 19:
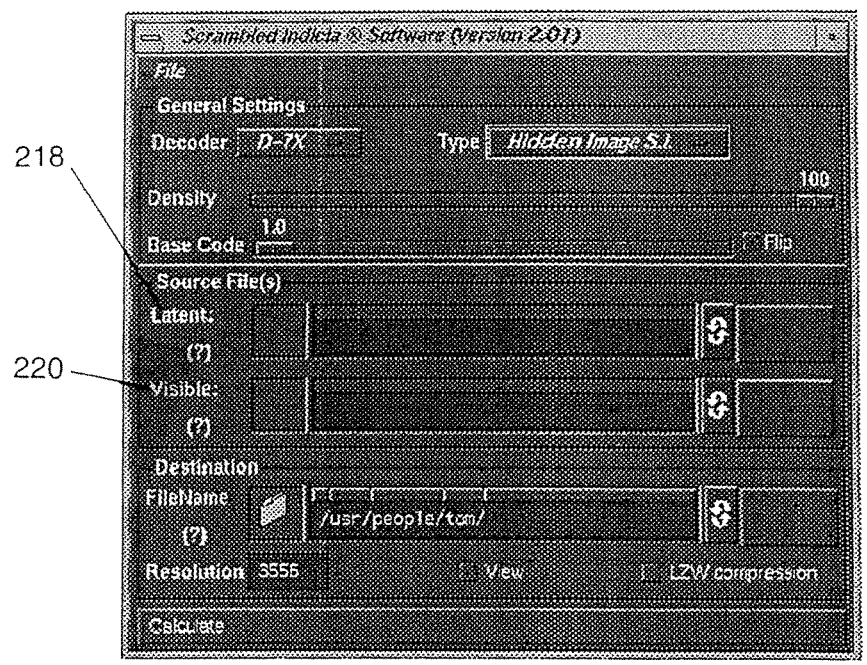
FIG. 19 shows the generalized screen for a hidden image type SI selection.

FIG. 19 shows the interface screen for a "hidden image" SI operation which provides input boxes for a latent image 18 and a visible image 0. This operation allows the user to mix two images together where one of the images becomes latent to the other which is visible. This effect will allow the latent image to be visible only when viewed through the decoder. Hidden image SI also allows use of an additional file to compensate for image offset. The hidden image SI is similar to the two phase SI (described above) and the indicia tint (below) except that the output background is a picture instead of white. The first step is to copy the visible image to the output image. After this, the method is similar to the indicia tint, but the density parameter controls the visibility of the image. Also, the hidden image technique is similar to the SI Raster (below), but a bitmap (single color) image is used instead of a grey scale image.

Figure 20:
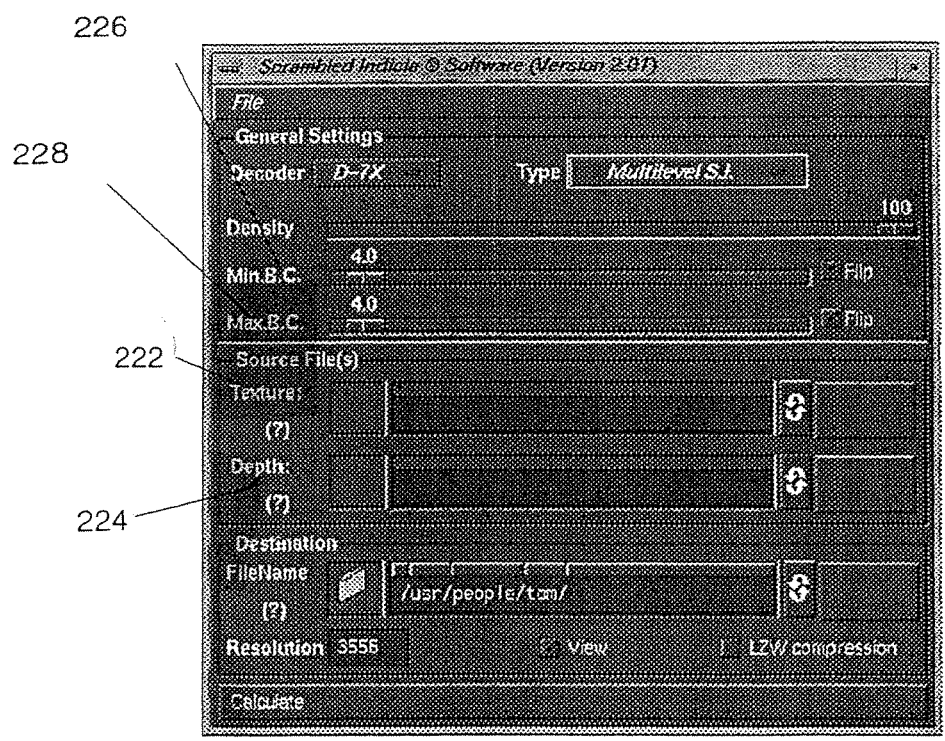
FIG. 20 shows the generalized screen for a multilevel type SI selection.

FIG. 20 shows the user interface screen for multilevel SI operation. The multilevel SI creates a scrambled image that contains a sense of depth perception. This type of scramble allows the user to set both a minimum base code 6 and maximum base code 8. This particular version of the SIS program uses two images, one image called the texture image and another called a depth image 4. During encoding, the tonal values of the depth image elements will cause a scrambling variant in the elements of the texture image. This variant will give the decoded image the illusion of depth, hence the name multilevel SI For example, this multilevel technique can simulate a 3-dimensional ("3-D") camera effect by placing a face in the depth image and applying less base code, while flipping the elements for added sharpness. The background would be placed in the texture file which would have more base code applied for more scrambling effect, and with no flipping of the elements. By superimposing these two scrambled images upon each other, the decoded face would appear to be sharper and have more depth than the surrounding background. Hence the face would appear to "float", thereby creating a 3-D effect.

Figure 21:
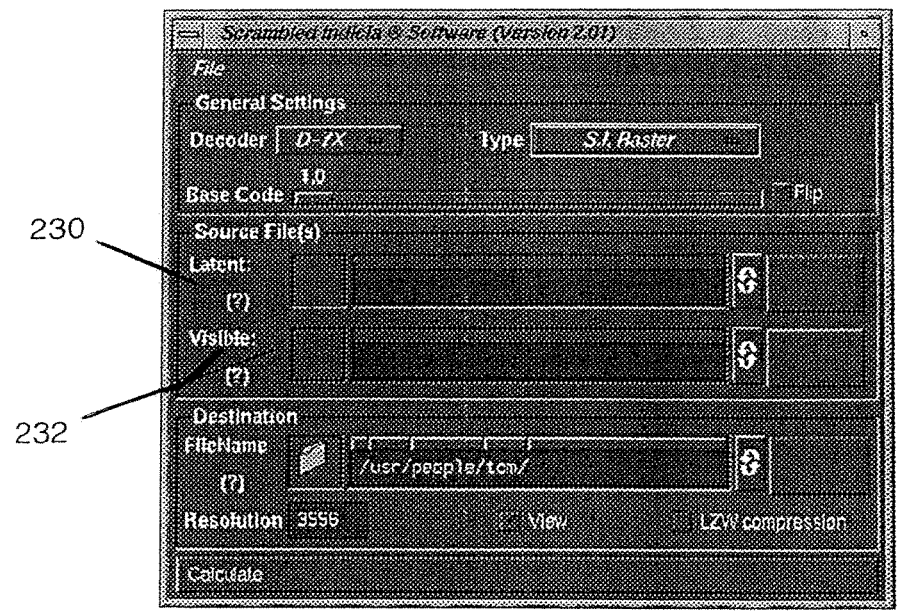
FIG. 21 shows the generalized screen for an SI Raster type selection.

Referring now to FIG. 21, the interface screen for an SI Raster operation is shown. The SI Raster allows the user to mix two images together where one of the images becomes latent 30 to the other which is visible 3. The latent image will interlace with the visible image following the grey scale values of that image. This effect will allow the latent image to be visible only when viewed through a decoder. Additionally, the latent image might consist of a one, two, or three multiphased image as created using previous interface screens for multi-phased images and saved in an appropriate file.

One of the most useful applications for the SI Rastering technique is where the visible image is a photograph and the latent image might be a signature of that person. Using the SIS program, the visible image can be rasterized and then the signature image can be scrambled and merged into the visible image raster pattern. The resulting encoded image will be a visible image of a person's photograph, which when decoded will reveal that person's signature. The latent image might include other vital statistics such as height, weight, etc. This high security encoded image would prove to be extremely useful on such items as passports, licenses, photo ID's, etc.

Figure 22:
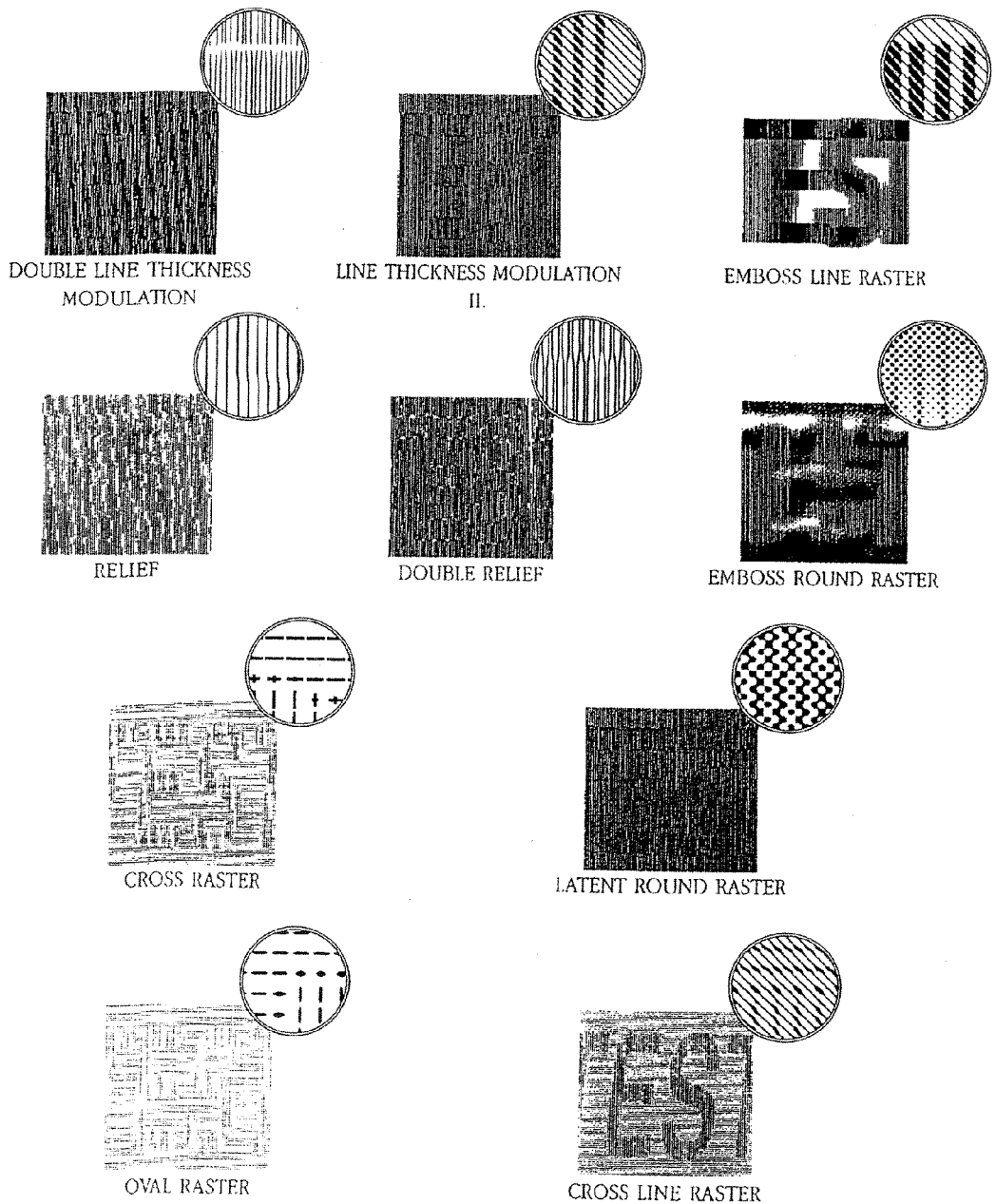
FIG. 22 shows examples of rastering techniques with the accompanying circles indicating an enlarged view of a portion of the overall pattern.

The processes described above have used line rastering techniques as derived from the suggested lenticular structure of the decoding lens. Other rastering techniques might also be used, which would be accompanied by corresponding decoder lenses capable of decoding such mastered and scrambled patterns. Referring now to FIG. 22, a series of example rastering techniques are shown which could similarly be used to encode scrambled images into rasterized visible source images. Accompanying each type of rastering is a circle showing an enlarged portion of the raster. The example types include: double line thickness modulation; line thickness modulation II; emboss line rastering; relief; double relief; emboss round raster; cross raster; latent round raster; oval raster; and cross line raster.

Another technique, cross embossed rastering, might use one frequency of lens density on the vertical plane and yet another frequency on the horizontal plane. The user would then check each latent image by rotating the lens. Yet another technique would include lenses which varying in frequency and/or refractive characteristics across the face of a single lens. Hence different parts of the printed matter could be encoded at different frequencies and still be decoded by a single lens for convenience. Undoubtedly many other rastering types exist which are easily adaptable to the SIS encoding techniques.

Regardless of the type of rastering used, a variety of other security measures could be performed using the SIS program and the underlying principles involved. For instance, the consecutive numbering system found on tickets or money might be scrambled to insure further security against copying. The SIS program might also digitally generate scrambled bar encoding. A Method and Apparatus For Scrambling and Unscrambling Bar Code Symbols has been earlier described in this inventors U.S. Pat. No. 4,914,700, the principles of which are hereby incorporated by reference.

Yet another common security printing technique includes using complex printed lines, borders, guilloches, and/or buttons which are difficult to forge or electronically reproduce. The SIS program can introduce scrambled patterns which follow certain lines on the printed matter, hence the inventor refers to this technique as Scrambled Micro Lines.

The security of the Scrambled Indicia might be further enhanced by making 3 color separations in Cyan, Magenta, and Yellow of the image after the SI process has been performed. These colors would then be adjusted to each other so that a natural grey could be obtained on the printed sheet when the colors are recombined. The inventor refers to this process as "grey match." Hence, while the printed image would appear grey to the unaided eye, the decoded image would appear in color. The adjustment of the separations to maintain a neutral grey becomes yet another factor to be controlled when using different combinations of ink, paper, and press. Maintaining these combinations adds another level of security to valuable document and currency.

Still another possible use of the SIS program would be to create interference, or void tint, combinations on printed matter. This technique will conceal certain words, like "void" or "invalid" on items such as concert tickets. If the ticket is photocopied, the underlying word "void" will appear on the copy and hence render it invalid to a ticket inspector. The SIS software would provide an efficient and low cost alternative to producing such void tint patterns.

The SIS program might also be adapted to produce watermark-type patterns which are typically introduced to paper via penetrating oil or varnish. Furthermore, the SIS program might be applicable to producing holograms via line diffraction methods. Again, the SIS program would prove to be more efficient and cost effective for producing such results.

Now referring to a second embodiment of the invention, the prior art of which is shown in FIG. 23, wherein like numerals refer to like parts, illustrates in FIG. 23 an example of typical recognizable indicium 310 can be used with the present invention. Recognizable indicium 310 shown includes the letter "A", and may also include other letters to form recognizable words, such as "Florida", or other symbols, or any recognizable or identifiable graphic image. Although contrasting background 314 is shown as white, and therefore is in maximum contrasting intensity relationship with indicium 310, background 314 can be chosen so as to be in a contrasting relationship selected to render a parallax panoramagram image more difficult to interpret or to render the parallax panoramagram image of indicium 310 more difficult to recognize as being a parallax panoramagram image. The minimum contrast required between indicium 310 and background 314 is dependent on lighting conditions under which the image of indicium 310 is to be recorded, as well as the sensitivity of the photosensitive surface on which the image of indicium 310 is to be recorded.

FIG. 23B shows recognizable indicium 310 of FIG. 23 encoded as parallax panoramagram image 310', which includes an encoded letter "A" against encoded background 314'. Encoding as a parallax panoramagram image can be accomplished using, for example, the apparatus disclosed in U.S. Pat. No. 4,092,654.

FIG. 23C shows transparent lenticular screen is used in the above-cited encoding process to provided encoded indicium 310'. As is well known, screen 316 includes a plurality of cylindrical lenticules 318 and is essentially a lineticular screen. As shown in FIG. 23D, to reconstruct, unscramble, or decode the encoded image of FIG. 23B, transparent lenticular screen 316', having a plurality of cylindrical lenticules 318' of the negative images can be registered with a high degree of precision.

According to this embodiment of the invention, a security graphic image is formed of a parallax panoramagram image incorporated into, or juxtaposed with an unencoded graphic image. As with the aforementioned embodiment, this can be formed through the use of a software method and apparatus for digitally scrambling and incorporating latent images into source image. Such juxtaposition, for example, includes forming a holographic image of one or both of the parallax panoramagram image and the unencoded graphic image, wherein the holographic image portrays these images as residing at differing apparent depth or planes. Where one of the images is holographic, the other image can be formed by a reflective diffracting surface, a transmissive diffracting surface, a secularly reflecting surface, or a diffusely reflecting surface, or any combination thereof.

Figure 23F:
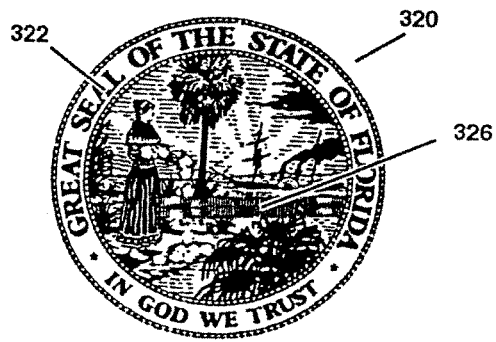
FIG. 23F is an example of an unencoded graphic.
Figure 24:
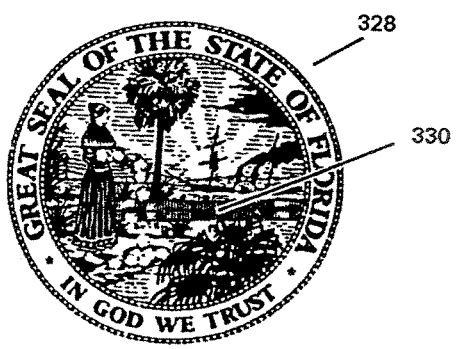
FIG. 24 is an example of a security graphic image showing the encoded recognizable indicium unobtrusively incorporated within the unencoded graphic.

In another preferred embodiment of the present invention, a security graphic image 328 is formed by unobtrusively incorporating a parallax panoramagram image within an unencoded graphic image, so as to effectively hide the parallax panoramagram image as shown in FIG. 24. For example, while region 330 with the dark region 326 of FIG. 23F appears to be a body of water extending behind the skirt of a woman standing in the foreground, in security graphic image 328, parallax panoramagram image 330 replaces at least part of dark region 326 of the unencoded graphic image 320 of FIG. 23F so as to appear to be an integral part of unencoded graphic image 320, e.g., an image of a body of water having reflection off its surface. Parallax panoramagram 330 is actually an encoding of the recognizable indicium "FLORIDA" which includes the letter "A" as shown in FIG. 23 as well as other letters that are encoded in a similar manner.

In an alternate embodiment, the unencoded graphic portion of a security graphic image can include copy-resistant content, such as a guilloche. A guilloche resembles a "spirograph", and may be difficult to copy because it incorporates fine, precise, and intricate detail.

According to the invention, a surface is formed having diffractive properties that vary over the surface in accordance with intensity variations in a graphic image such as is shown in FIG. 24. As noted earlier herein, the parallax panoramagram image within the security graphic image is unexpectedly still decodable, even when the image exists in the form of variations in the diffractive properties of a surface, such as diffraction due to variations in the brazing angle over the surface of a reflective diffraction grating, or diffraction induced by the surface of an embossed hologram.

Figure 27:
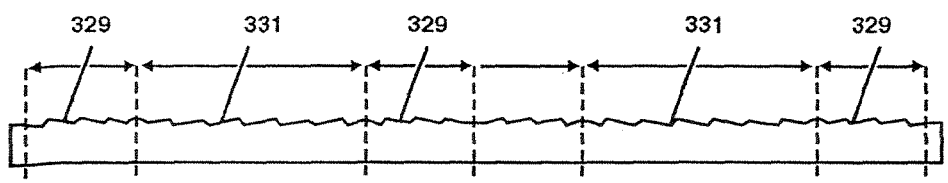
FIG. 27 is a schematic, exaggerated cross-section through another embodiment of the present invention showing through another embodiment of the present invention showing sections of the surface embossed with a diffraction grating at two different blasé angles.
Figure 28:
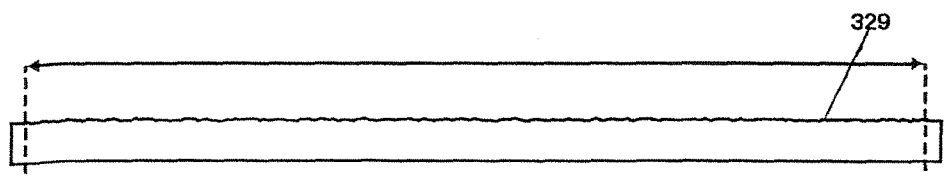
FIG. 28 is a schematic, exaggerated cross-section through yet another embodiment of the present invention showing the surface embossed with a hologram.

In yet another preferred embodiment illustrated in FIG. 27, the diffractive surface includes a plurality of regions 329 of reflective diffraction grating of a first brazing angle, and a plurality of regions 331 of a reflective diffraction grating of a second brazing angle. The first and second plurality of regions 329 and 331 are distributed over the reflective surface so as to form a security graphic image, such as the security graphic image 322 of FIG. 24.

The invention also includes devices in which a diffractive surface is formed with a portion having diffractive properties that vary in accordance only with an encoded graphic image, and another surface portion having some combination of diffusing, absorbing, translucent, or secularly reflecting properties, wherein a parallax panoramagram image is printed in juxtaposition with respect to the diffractive portion, or on a non-diffracting portion of the surface that surrounded by the diffractive portion using, for example, light absorbing, diffusing, or reflecting ink, pain, or pigment.

Figure 25:
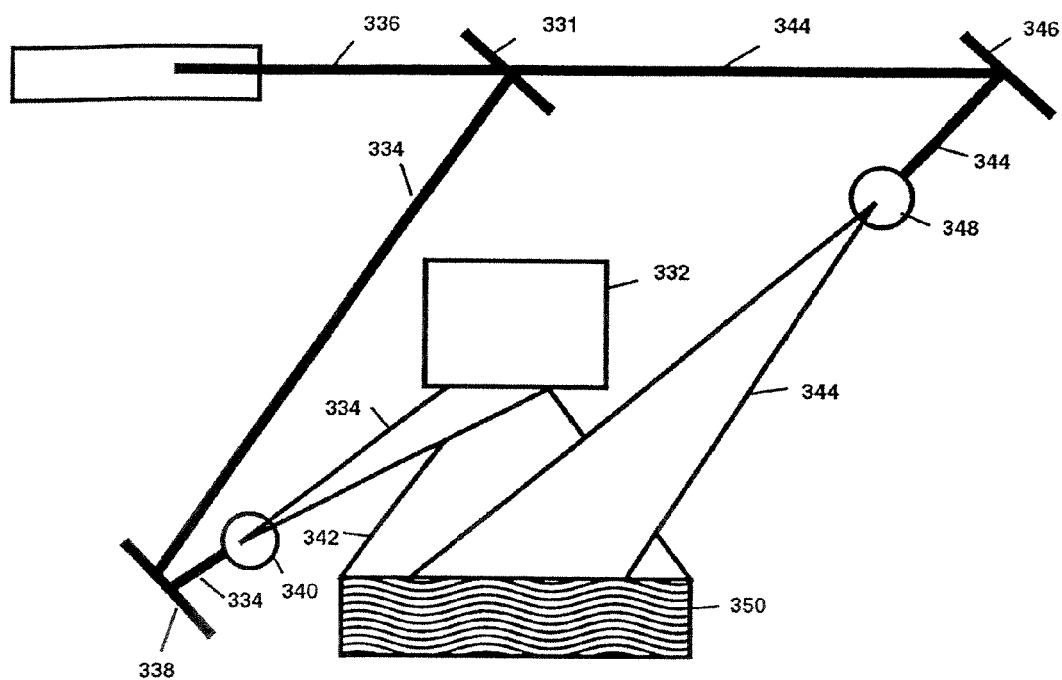
FIG. 25 is a diagram showing prior apparatus that can be used to record a holographic image of at least an encoded indicium to be used in forming an embossed hologram that incorporates the encoded indicium.
Figure 26:
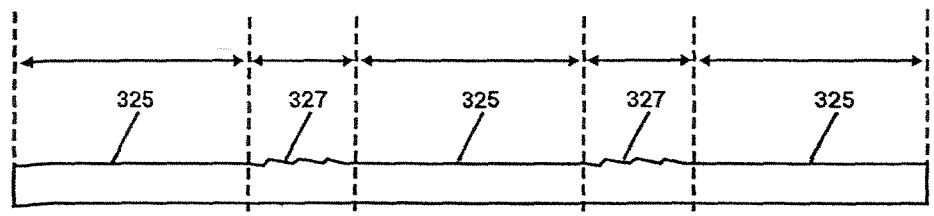
FIG. 26 is a schematic, exaggerated cross-section through one embodiment of the present invention showing sections of the surface embossed with a diffraction grating at a given blaze angle and sections embossed with a hologram.

With reference to FIG. 25 according to the invention, security graphic image 332 can be rendered entirely as an embossed hologram. Security graphic image 332, which may include or consist entirely of an image of a scrambled or encoded recognizable indicium, is formed on a flat substrate. As is well know in the holographic area (see, for example, Holography Market Place, Third Edition, Kluepfel and Ross, Eds., 1991. Ross Books, Berkeley, Calif. 94704, incorporated herein by reference), to form a hologram of the security graphic image 332, as shown in FIG. 25, the security graphic image is illuminated by a first portion 334 of a laser beam 336, provided by a beam-splitter 337, a mirror 338 an a lens 340. Reflected light 342 from a security graphic image 332 interferes with a second portion of the laser beam 344 via a mirror 346 and a lens 348, forming interference fringes. A recording material or light-sensitive plate 350, typically a silver halide emulsion, dichromated gelatin, a photopolymer, a photoresist or the like, or example, is disposed for recording the pattern of interference fringes produced thereby. For example, where plate 350 is a photoresist, the photoresist is etched, and then plated with a metal such as silver, nickel or the like, for example. The layer of metal deposited on plate 350 then includes holographic patterns in relief, and can be removed to serve as a metal mold, known as a "shim". The shim serves as a metal stamping die for stamping the holographic pattern into, for example, a high-molecular weight polymer or plastic. A plastic sheet or film having the holographic pattern embossed thereon can be used as a transmissive embossed hologram, or can be coated or laminated with a reflective or mirror-like backing to produce a reflective embossed hologram. Typically, the reflective or mirror-like backing is applied to the embossed side of the plastic sheet or film, and the reflective embossed hologram is viewed through the unembossed side of the sheet or film.

In an alternate embodiment of the invention, security graphic image 332 includes unencoded graphic materials, such as a guilloche, or other finely detailed graphic material which an embossed holograph is prepared. After the holographic pattern of such unencoded graphic material has been recorded and then embossed into a plastic sheet or film using a holographic shim or die, a second shim is embossed in to the plastic sheet or film. The second shim was prepared by incorporating an encoded parallax panoramagram of a recognizable indicium, and bears, in relief, regions of diffraction gratings of distinct diffraction properties distributed over the surface of the shim in accordance with intensity variations in the parallax panoramagram. For example, the pattern of regions of diffraction gratings can be a reflection diffraction grating having regions of a first brazing angle and regions of a second brazing angle. After the second shim is embossed into the plastic sheet film, the plastic sheet or film can be coated or laminated with a reflective or mirror-like backing to produce a reflective surface having regions of a plurality of diffractive properties, including holographic properties.]

Figure 29:
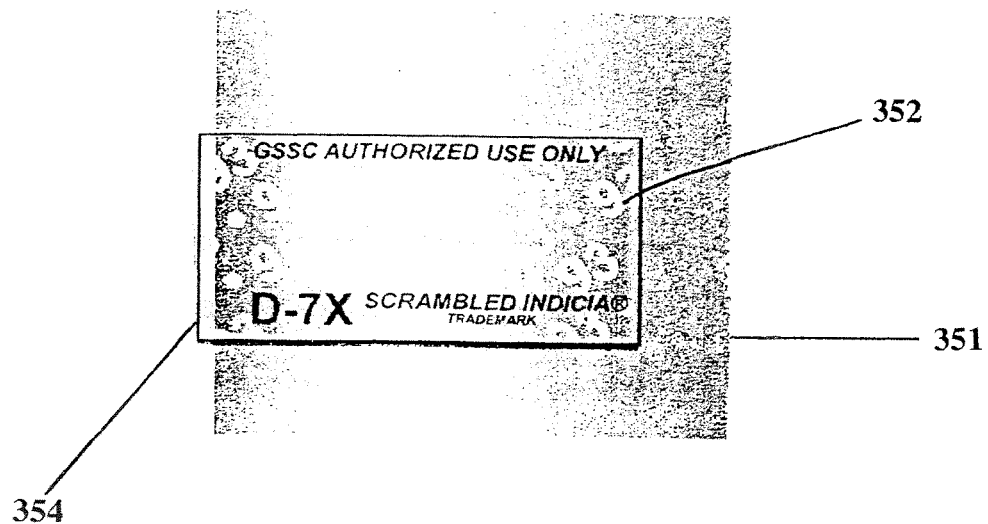
FIG. 29 is a top plane view of a tamperproof foil having a hidden image formed from a computer driven mechanical etching machine.

FIG. 29 is a top plane view of a tamper-proof foil 351 having latent hidden image 352 formed from a computer driven mechanical etching machine. The hidden image 352, in this example the numeral 93 indicates the year of creation, can be viewed only by use of a decoder lens 354 having frequency capable of revealing the latent hidden image. The image may be digitally scanned into a computer system by use of a computer scanner.

The ability to conceal any type of hidden image allows a point of use input including a persons name, birth date, social security number and so forth. The hidden image including variable information may be placed on bank notes, stock certificates, bonds, travelers checks, lottery tickets, passports, airline tickets, gift certificates, bank checks, postal money orders, credit cards, photo identification, drivers license, postage stamps and like documents.

The process of formation includes calculating the line/inch, employing the appropriate reduction factor, and sizing the image to a decoder having a particular frequency. The image may be screened or manipulated using normal commercial graphic arts screening and special effect techniques.

It is to be understood that while I have illustrated and described certain forms of my invention, it is not to be limited to the specific forms or arrangement of parts herein describe and shown. It will be apparent to those skilled in the art that various changes may be made without departing from the scope of the invention and the invention is not to be considered limited to what is shown in the drawings and described in the specification.

What is claimed is:

1. An automated method for digitally encoding at least one digital image into a source image so that the at least one digital image is not discernible within the source image without application of a reader having a frequency pattern, the method comprising:
   obtaining the at least one digital image having a first pattern of line elements, the first pattern of line elements corresponding to the selected frequency pattern of the reader;
   obtaining the source image having a second pattern of line elements;
   applying an encoding algorithm to incorporate the at least one digital image into the source image; and
   generating a revised source image comprising the first pattern of line elements and the second pattern of line elements,
   wherein the revised source image substantially replicates the source image when viewed without the reader, and
   wherein the first pattern of line elements are configured in the revised source image to be hidden until viewed with the reader having the selected frequency pattern.

2. An automated method according to claim 1 wherein the first pattern of line elements and the second pattern of line elements are regularly spaced.

3. An automated method according to claim 1 wherein the first pattern of line elements and the second pattern of line elements are regularly spaced and form a two dimensional array of non-linear shapes.

4. An automated method according to claim 1 wherein applying the encoding algorithm includes interlacing the first pattern of line elements and the second pattern of line elements.

5. An automated method according to claim 1 further comprising: forming the revised source image on a substrate.

6. An automated method according to claim 5 wherein forming the revised source image on the substrate includes printing the revised source image on the substrate.

7. A non-transitory computer storage medium having software code stored thereon, the software code being configured to cause a computer to execute a method for digitally encoding at least one digital image into a source image so that the at least one digital image is not discernible within the source image without application of a reader having a selected frequency pattern, the method comprising:
    obtaining the at least one digital image having a first pattern of line elements, the first pattern of line elements corresponding to the selected frequency pattern of the reader;
    obtaining the source image having a second pattern of line elements;
    applying an encoding algorithm to incorporate the at least one digital image into the source image; and
    generating a revised source image comprising the first pattern of line elements and the second pattern of line elements,
    wherein the revised source image substantially replicates the source image when viewed without the reader, and
    wherein the first pattern of line elements are configured in the revised source image to be hidden until viewed with the reader having the selected frequency pattern.

8. A non-transitory computer storage medium according to claim 7 wherein the first pattern of line elements and the second pattern of line elements are regularly spaced.

9. A non-transitory computer storage medium according to claim 7 wherein the first pattern of line elements and the second pattern of line elements are regularly spaced and form a two dimensional array of non-linear shapes.

10. A non-transitory computer storage medium according to claim 7 wherein applying the encoding algorithm includes interlacing the first pattern of line elements and the second pattern of line elements.

11. The automated method according to claim 2, wherein the first pattern of line elements and the second pattern of line elements are regularly spaced to correspond to the reader having the frequency pattern that matches the first pattern of line elements.

12. The automated method according to claim 11, wherein the first pattern of line elements is different from the second pattern of line elements.

13. The automated method according to claim 1, further comprising:
    obtaining a second digital image having a third pattern of line elements, the third pattern of line elements being oriented at a predefined angle relative to the digital image having the first pattern of line elements;
    applying a second encoding algorithm to incorporate the second digital image into the source image; and
    generating a second revised source image comprising the first pattern of line elements, the second pattern of line elements, and the third pattern of line elements,
    wherein the second revised source image substantially replicates the source image when viewed without the reader, and
    wherein the first pattern of line elements and the third pattern of line elements are configured in the second revised source image to be hidden until viewed with the reader having the selected frequency pattern.

14. The automated method according to claim 13, wherein the second encoding algorithm is different from the encoding algorithm and wherein the third pattern of line elements is different from the first pattern of line elements and the second pattern of line elements.

15. The automated method according to claim 6, wherein printing the revised source image on the substrate is performed using at least one of an ink, a magnetic ink and a fluorescent ink.

16. The non-transitory computer storage medium according to claim 7, wherein the first pattern of line elements and the second pattern of line elements are regularly spaced to correspond to the reader having the frequency pattern that matches the first pattern of line elements.

17. The non-transitory computer storage medium according to claim 16, wherein the first pattern of line elements is different from the second pattern of line elements.

18. The non-transitory computer storage medium according to claim 7, further comprising:
    obtaining a second digital image having a third pattern of line elements, the third pattern of line elements being oriented at a predefined angle relative to the digital image having the first pattern of line elements;
    applying a second encoding algorithm to incorporate the second digital image into the source image; and
    generating a second revised source image comprising the first pattern of line elements, the second pattern of line elements, and the third pattern of line elements,
    wherein the second revised source image substantially replicates the source image when viewed without the reader, and
    wherein the first pattern of line elements and the third pattern of line elements are configured in the second revised source image to be hidden until viewed with the reader having the selected frequency pattern.

19. The non-transitory computer storage medium according to claim 7 further comprising sending a signal to a printer to form the revised source image on a substrate.

20. The non-transitory computer storage medium according to claim 7, wherein sending the signal to the printer includes selecting at least one of an ink, a magnetic ink and a fluorescent ink for printing the revised source image.

* * * * *